(12) United States Patent
Chang et al.

(10) Patent No.: US 10,117,104 B2
(45) Date of Patent: Oct. 30, 2018

(54) RESOURCE ALLOCATION METHOD AND APPARATUS FOR COOPERATIVE TRANSMISSION OF BASE STATIONS IN WIRELESS COMMUNICATION SYSTEM

(71) Applicant: Samsung Electronics Co., Ltd., Suwon-si, Gyeonggi-do (KR)

(72) Inventors: Youngbin Chang, Anyang-si (KR); Yeongmoon Son, Yongin-si (KR); Rakesh Taori, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 622 days.

(21) Appl. No.: 13/951,999

(22) Filed: Jul. 26, 2013

(65) Prior Publication Data

US 2014/0029531 A1 Jan. 30, 2014

(30) Foreign Application Priority Data

Jul. 27, 2012 (KR) .................. 10-2012-0082081

(51) Int. Cl.
| | |
|---|---|
| *H04W 16/14* | (2009.01) |
| *H04W 16/12* | (2009.01) |
| *H04L 5/00* | (2006.01) |
| *H04W 72/04* | (2009.01) |
| *H04W 88/02* | (2009.01) |
| *H04W 88/08* | (2009.01) |

(52) U.S. Cl.
CPC ............ *H04W 16/14* (2013.01); *H04L 5/005* (2013.01); *H04W 16/12* (2013.01); *H04W 72/04* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,774,037 B2 * | 7/2014 | Kim ....................... | H04B 7/024 370/252 |
| 8,942,081 B2 * | 1/2015 | Kang .................. | H04W 72/042 370/208 |
| 9,185,711 B2 * | 11/2015 | Lin ..................... | H04B 7/15542 |
| 9,320,042 B2 * | 4/2016 | Ono ....................... | H04W 72/08 |

(Continued)

FOREIGN PATENT DOCUMENTS

| | | |
|---|---|---|
| JP | WO2011125131 | * 10/2011 |
| KR | 10-1997-0055855 A | 7/1997 |

*Primary Examiner* — Steve R Young
(74) *Attorney, Agent, or Firm* — Jefferson IP Law, LLP

(57) ABSTRACT

A resource allocation method and apparatus whereby a master base station of a virtual cell having at least one slave base station for cooperative resource allocation to a mobile station in a wireless communication system are provided. The resource allocation method includes transmitting, to the slave base station, a resource allocation request message including information on the resource to be allocated to the mobile station, receiving a resource allocation response message including one of accept and reject indications to the resource allocation request from the slave base station, transmitting, to the mobile station, a resource allocation information including a result of resource allocation negotiation with the slave base station, and transmitting data to the mobile station in cooperation with the slave base station based on the resource allocation information.

29 Claims, 24 Drawing Sheets

(56) References Cited

U.S. PATENT DOCUMENTS

| | | | |
|---|---|---|---|
| 9,401,748 B2* | 7/2016 | Chen | H04B 7/0417 |
| 9,775,135 B2* | 9/2017 | Seo | H04W 72/0406 |
| 2009/0046641 A1 | 2/2009 | Wang et al. | |
| 2009/0249350 A1* | 10/2009 | Senders | G06Q 10/10 |
| | | | 718/104 |
| 2010/0157901 A1 | 6/2010 | Sanderovitz et al. | |
| 2010/0309869 A1 | 12/2010 | Kim et al. | |
| 2011/0002275 A1 | 1/2011 | Shousterman | |
| 2011/0103339 A1* | 5/2011 | Kim | H04B 7/024 |
| | | | 370/329 |
| 2011/0218010 A1* | 9/2011 | Hoymann | H04B 7/024 |
| | | | 455/513 |
| 2011/0218016 A1* | 9/2011 | Hirakawa | H04B 7/024 |
| | | | 455/524 |
| 2011/0249642 A1 | 10/2011 | Song et al. | |
| 2011/0255526 A1* | 10/2011 | Kaneko | H04B 7/022 |
| | | | 370/338 |
| 2012/0084342 A1* | 4/2012 | Brown | H04N 21/2543 |
| | | | 709/203 |
| 2013/0215772 A1* | 8/2013 | Kaur | H04W 36/0072 |
| | | | 370/252 |

* cited by examiner

RESOURCE ALLOCATION METHOD AND APPARATUS FOR COOPERATIVE TRANSMISSION OF BASE STATIONS IN WIRELESS COMMUNICATION SYSTEM

CROSS-REFERENCE TO RELATED APPLICATION(S)

This application claims the benefit under 35 U.S.C. § 119(a) of a Korean patent application filed on Jul. 27, 2012 in the Korean Intellectual Property Office and assigned Ser. No. 10-2012-0082081, the entire disclosure of which is hereby incorporated by reference.

TECHNICAL FIELD

The present disclosure relates to a wireless communication system and, in particular, to a resource allocation method and apparatus for facilitating the cooperative transmission of base stations in a wireless communication system.

BACKGROUND

Mobile communication systems have been developed to provide subscribers with voice communication services on the move. With the rapid advance of technologies, the mobile communication systems have evolved to support high speed data communication services as well as standard voice communication services. However, the limited resources and the user requirements for higher speed services in the current mobile communication system environment have spurred the evolution to more advanced mobile communication systems.

FIGS. 1A and 1B are diagrams illustrating resource allocation methods for communication between a Mobile Station (MS) and plural Base Stations (BSs) in wireless communication systems according to the related art.

Referring to FIG. 1A, the figure is directed to the case where the plural BSs 120*a*, 120*b*, and 120*c* serve the MS 130 with the assistance of the Base Station Controller (BSC) 100 cooperatively. That is, when the plural BSs 120*a*, 120*b*, and 12*c* transmit downlink data to the MS 130 and receive uplink data from the MS 130, the BSC 110 determines the radio resources for use in transmitting uplink data from the BSs 120*a*, 120*b*, and 120*c* to the MS 130 and downlink data from the MS 130 to the BSs 120*a*, 120*b*, and 120*c*; and notifies the stations 120*a*, 120*b*, 120*c*, and 130 of the allocated resources. That is, the BSC 110 makes a resource allocation decision for data transmission from the plural BSs 120*a*, 120*b*, and 120*c* to the MS 130 and notifies the BSs 120*a*, 120*b*, and 120*c* and MS 130 of the resource allocation result.

Referring to FIG. 1B, the figure is directed to the case where independent BSs 140*a*, 140*b*, and 140*c* serve the MS 150 cooperatively in a distributed resource allocation method. In this case, since the BSs 140*a*, 140*b*, and 140*c* make resource allocation decision to the MS 150 independently, it is impossible for one BS to make a resource allocation decision. Accordingly, the BSs 140*a*, 140*b*, and 140*c* allocate resources to the MS 150 so as to minimize interference among each other. That is, the BS 1 140*a* makes a resource allocation decision for downlink and uplink transmission for the MS in consideration of the interference to the BS 2 140*b* and the BS 3 140*c* so as to minimize interference thereto. In order to share the interference information, the BSs 140*a*, 140*b*, and 140*c* may exchange resource allocation information, the BSs and MS may measure the interference in itself for use in resource allocation. In the case of FIG. 1B, however, although the plural BSs may allocate the radio resources capable of minimizing interference there between, it is impossible for serving the MS using any common radio resource.

As described above, in order for the plural BSs to serve an MS cooperatively in the related-art method, it is necessary for a control entity to determine the radio resource allocation method in a centralized manner (FIG. 1A) or for the base stations to make resource allocation decision so as to minimize the interference there between in a distributed manner (FIG. 1B).

Accordingly, a need exists for a method and apparatus for allocating resources and for facilitating cooperation among base stations in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure to provide a method for determining a host and scheme of allocating resource capable of allocating radio resource efficiently in the cooperative communication of plural BSs with an MS.

In accordance with an aspect of the present disclosure, a resource allocation method of a master base station of a virtual cell having at least one slave base station for cooperative resource allocation to a mobile station in a wireless communication system includes transmitting, to the slave base station, a resource allocation request message including information on a resource to be allocated to the mobile station, receiving a resource allocation response message including one of accept and reject indications to the resource allocation request from the slave base station, transmitting, to the mobile station, a resource allocation information including a result of resource allocation negotiation with the slave base station, and transmitting data to the mobile station in cooperation with the slave base station based on the resource allocation information.

In accordance with another aspect of the present disclosure, a resource allocation method of a slave base station of a virtual cell having one master base station for cooperative resource allocation to a mobile station in a wireless communication system includes receiving a resource allocation request message including information on a resource to be allocated to the mobile station from the master base station, determining whether to accept or reject the resource allocation request of the master base station, transmitting a resource allocation response message including a determination result to the master base station, and transmitting data to the mobile station in cooperation with the master base station using the resource determined through resource allocation negotiation with the master base station.

In accordance with another aspect of the present disclosure, a resource allocation method of a master base station of a virtual cell having at least one slave base station for cooperative resource allocation to a mobile station in a wireless communication system includes transmitting transmissive data information for initiating resource allocation negotiation to the slave base station, receiving a response message including resource allocation information for data transmission to the mobile station from the slave base station, and transmitting data to the mobile station in cooperation with the slave base station based on the resource allocation information.

In accordance with another aspect of the present disclosure, a resource allocation method of a slave base station of a virtual cell having a master base station for cooperative resource allocation to a mobile station in a wireless communication system includes initiating resource allocation negotiation with the master base station upon receipt of transmissive data information transmitted by the master base station, generating resource allocation information for data transmission to the mobile station, transmitting a response message including the resource allocation information to the master base station, and transmitting data to the mobile station in cooperation with the master base station based on the resource allocation information.

In accordance with another aspect of the present disclosure, a master base station of a virtual cell having at least one slave base station for cooperative resource allocation to a mobile station in a wireless communication system includes a wired/wireless interface unit to perform wired/wireless communication with the mobile station and neighbor base stations, and a control unit which controls to perform transmitting, to the slave base station, a resource allocation request message including information on a resource to be allocated to the mobile station, receiving a resource allocation response message including one of accept and reject indications to the resource allocation request from the slave base station, transmitting, to the mobile station, a resource allocation information including a result of resource allocation negotiation with the slave base station, and transmitting data to the mobile station in cooperation with the slave base station based on the resource allocation information.

In accordance with another aspect of the present disclosure, a slave base station of a virtual cell having one master base station for cooperative resource allocation to a mobile station in a wireless communication system includes a wired/wireless interface unit to perform wired/wireless communication with the mobile station and neighbor base stations, and a control unit which controls to perform receiving a resource allocation request message including information on a resource to be allocated to the mobile station from the master base station, determining whether to accept or reject the resource allocation request of the master base station, transmitting a resource allocation response message including a determination result to the master base station, and transmitting data to the mobile station in cooperation with the master base station using the resource determined through resource allocation negotiation with the master base station.

In accordance with another aspect of the present disclosure, a master base station of a virtual cell formed along with at least one slave base station for cooperative resource allocation to a mobile station in a wireless communication system includes a wired/wireless interface unit to perform wired/wireless communication with the mobile station and neighbor base stations, and a control unit which controls to perform transmitting transmissive data information for initiating resource allocation negotiation to the slave base station, receiving a response message including a resource allocation information for data transmission to the mobile station from the slave base station, and transmitting data to the mobile station in cooperation with the slave base station based on the resource allocation information.

In accordance with still another aspect of the present disclosure, a slave base station of a virtual cell having a master base station for cooperative resource allocation to a mobile station in a wireless communication system includes a wired/wireless interface unit to perform wired/wireless communication with the mobile station and neighbor base stations, and a control unit which controls initiating resource allocation negotiation with the master base station upon receipt of transmissive data information transmitted by the master base station, generating resource allocation information for data transmission to the mobile station, transmitting a response message including the resource allocation information to the master base station, and transmitting data to the mobile station in cooperation with the master base station based on the resource allocation information.

In accordance with still another an aspect of the present disclosure, one of plural base stations is determined as a logical master base station and the others as logical slave base stations such that the master base station performs a negotiation and a determination procedure for resource allocation to the mobile terminal. Any of the plural base stations can work as the master base station, the master base station can be changed as the mobile station moves, and the master base station can be differentiated from a certain centralized preset base station control apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
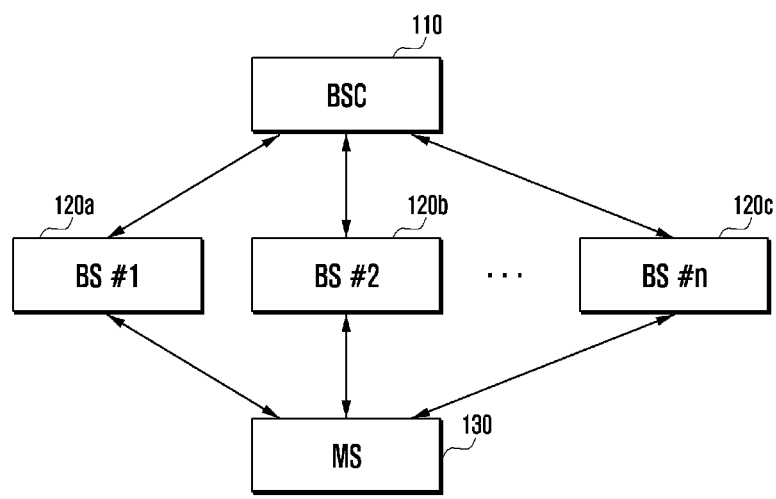
FIGS. 1A and 1B are diagrams illustrating resource allocation methods for communication between a Mobile Station (MS) and plural Base Stations (BSs) in wireless communication systems according to the related art.
Figure 1B:
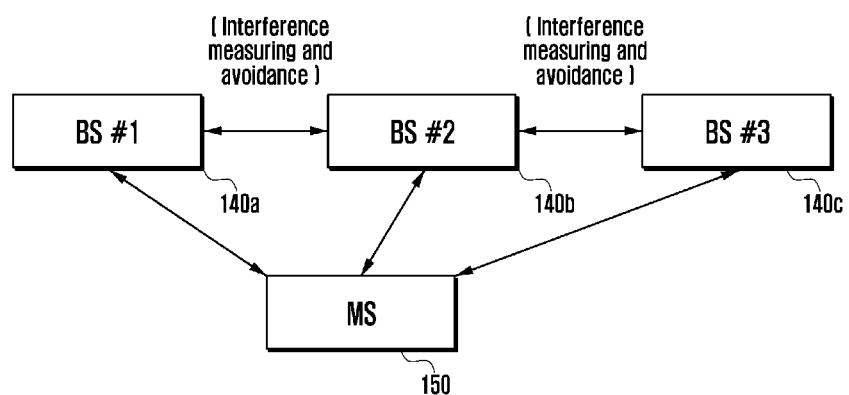
Figure 2:
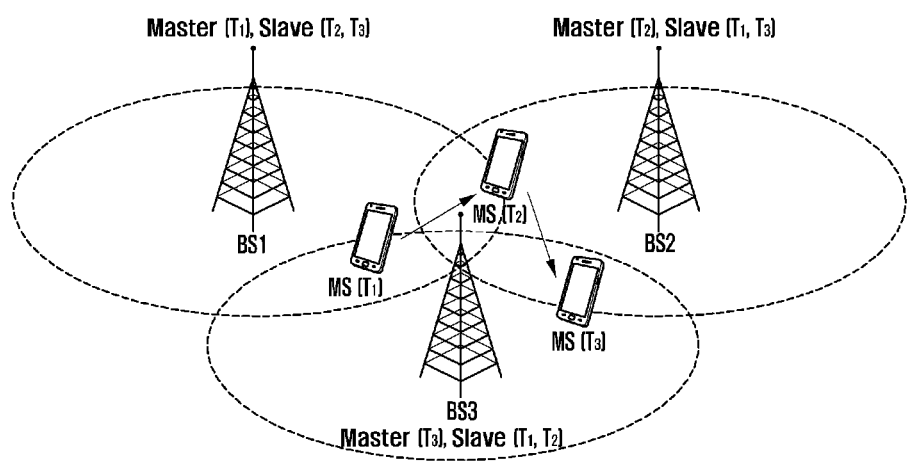
FIG. 2 is a diagram illustrating master-slave relationships among plural BSs and MSs for supporting cooperative communication according to an embodiment of the present disclosure.

FIG. 2 is a diagram illustrating master-slave relationships among plural Base Stations (BSs) and Mobile Stations (MS) for supporting cooperative communication according to an embodiment of the present disclosure.

Referring to FIG. 2, it is assumed that three BSs (BS1, BS2, and BS3) form the respective virtual cells for providing wireless data service and are capable of transmitting and receiving data to and from the MS cooperatively. That is, the MS is capable of receiving or transmitting data from or to the three BSs simultaneously. The MS is also capable of receiving or transmitting data from or to one or two of the BSs selectively. The MS may receive the same data from the three BSs simultaneously. The three BSs may transmit the same data or different data segments that can be combined into the original data at the MS. Although the description may be directed to a certain case, the present disclosure is not limited thereto. In order for the MS to support the cooperative data communication with the three BSs, it is necessary to establish the master-slave relationship among the BSs. The master BS has the determination right in resource allocation negotiation for data communication between the MS and the three BSs. The slave BS negotiates resource allocation for serving the MS with the master BS and communicates data with the MS based on the resource allocation information determined by the master BS.

A description of the method for establishing master-slave relationship according to an embodiment of the present disclosure is made hereinafter with reference to FIG. 2.

If it powers on, the MS performs a measurement to check the radio signal quality between the MS and each of the BSs. It is possible to measure the signal quality based on a signal strength, a Signal to Noise Ratio (SNR), or a Signal to Interference and Noise Ratio (SINR) of the synchronization signal, such as preambles, transmitted by the BSs. The MS performs network entry to the BS having the best signal quality as a result of measurement. Once the network entry procedure has completed successfully, the BS to which the MS has connected becomes the master BS. The master BS receives signal quality report from the MS and configures the BSs capable of communicating with the MS as slave BSs. The master BS to which the MS has performed the network entry procedure and the slave BS configured by the master BS establish a virtual cell which provides the MS with the communication service cooperatively.

Assuming that BS1 is the master BS of the MS at time T1 and BS2 and BS3 are slave BSs in FIG. 2, the BS1, BS2, and BS3 establishes a virtual cell for providing the MS with the data communication service cooperatively under the control of the BS1.

Meanwhile, if the signal quality of the BS2 becomes better than those of BS3 and BS3 due to the roaming of the MS at time T2, the BS1 hands over the mastery right to BS2. Likewise, if the signal quality of the BS3 becomes better than those of BS1 and BS3 due to the roaming of the MS at time T3, BS2 hands over the mastery right to BS3.

That is, in the case that plural BSs (BS1, BS2, and BS3) are capable of establishing a virtual cell for cooperative data communication, one of the BSs establishing the virtual cell becomes the master BS and the others slave BSs.

In an embodiment, the master BS may be the BS selected among the BSs establishing the virtual cell based on their signal qualities measured by the MS as in FIG. 2, the serving BS managing the MS information on the Medium Access Control (MAC) as layer 2 among the BSs establishing the virtual cell, or the BS selected by a Gateway operating at a level higher than BSs or a network entity controlling BSs. Although there are various approaches for determining the master BS, the present disclosure is directed to a radio resource allocation method based on the relationship between master and slave BSs regardless of how the master and slave BSs are configured.

Figure 3:
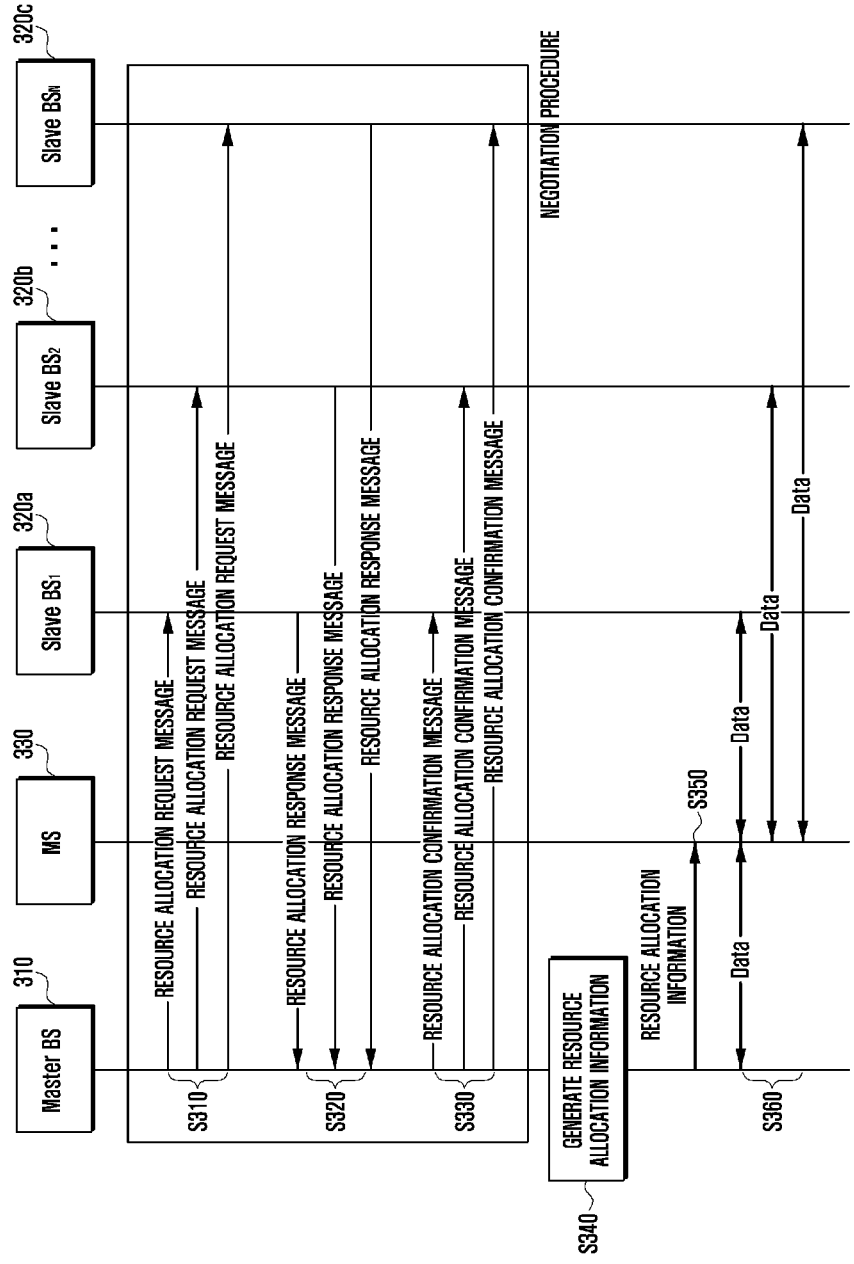
FIG. 3 is a signal flow diagram illustrating a resource allocation negotiation method for data transmission with a slave BSs' resources between master and slave BSs according to an embodiment of the present disclosure.

FIG. 3 is a signal flow diagram illustrating a resource allocation negotiation method for data transmission with a slave BSs' resources between master and slave BSs according to an embodiment of the present disclosure.

Referring to FIG. 3, assuming a virtual cell established by one maser BS 310 and one or more slave BSs 320a, 320b, and 320c; the master BS 310 is capable of performing cooperative resource allocation to the MS 330 as follows.

Assuming that the master BS 310 has the radio channel information and resource headroom information on all BSs forming the virtual cell, the master BS 310 performs negotiation for resource allocation with the slave BSs 320a, 320b, and 320c. The negotiation process is described hereinafter.

In an embodiment, the master BS 310 sends a resource allocation request message to the slave BSs 320a, 320b, and 320c at operation S310. The resource allocation request message may include radio resource information requesting the slave BSs 320a, 320b, and 320c to allocate resource to the MS, i.e., the information on the frequency and time resources. Assuming an OFDM system, the radio resource information includes the number of OFDM Resource Blocks (RBs) and OFDM sub-channel and symbol configuration.

In this embodiment, the master BS 310 requests the slave BSs 320a, 320b, and 320c to allocate specific radio resources to the MS. In this case, the master BS 310 may inform the slave BSs 320a, 320b, and 320c of specific OFDM sub-channels and OFDM symbols.

According to an embodiment of the present disclosure, the master BS 310 is capable of transmitting the data addressed to the MS 330 to the slave BSs 320a, 320b, and 320c along with the resource allocation message. In the case that the data to be transmitted to the MS 330 are retained in the slave BSs 320a, 320b, and 320c, the master BS may inform the slave BSs 320a, 320b, and 320c of specific data.

If the resource allocation message is received, each of the slave BSs 320a, 320b, and 320c sends the master BS 310 a resource allocation response message including the information on whether to accept or reject the resource allocation request or the available RBs among the RBs requested by the master BS 310 at operation S320. Each of the slave BSs 320a, 320b, and 320c determines whether to accept entirely or partially or reject the resource allocation request from the master BS 310 in consideration of resource headroom, resource reserved for other MSs, interference on the resources requested by the master BS 310, and radio channel status. Detailed description thereon is made hereinafter.

If the resource allocation response message is received from at least one of the slave BSs 320a, 320b, and 320c, the master BS 310 sends a resource allocation confirmation message to the slave BSs 320a, 320b, and 320c at operation S330. If the data to be transmitted to the MS 330 are not shared with the slave BSs 320a, 320b, and 320c until now, the master BS 310 may transmit the data addressed to the MS to the slave BSs 320a, 320b, and 320c along with the resource allocation confirmation message at operation S330.

In an embodiment, the resource allocation confirmation message includes the information on whether the resource allocation is accepted or rejected finally or the scheduling information on the allocation-confirmed resource. The transmission of the resource allocation confirmation message may be skipped depending on the information included in the resource allocation response message.

The master BS 310 generates the resource allocation information (or scheduling information) at operation S340 by reflecting the resource allocation negotiation procedure with the slave BSs 320a, 320b, and 320c that is performed through operations S310 to S330. The master BS 310 sends the MS 330 the resource allocation information at operation S350. Afterward, the master BS 310 may transmit the data to the slave BSs 320a, 320b, and 320c at operation S360 after the end of the resource allocation negotiation procedure.

Then, the MS 330 is capable of transmitting and receiving data with the BSs forming the virtual cell cooperatively. A detailed description on the radio data transmission is omitted herein. However, all available cooperative downlink and uplink transmissions of plural BSs can be applied in the present disclosure.

Figure 4A:
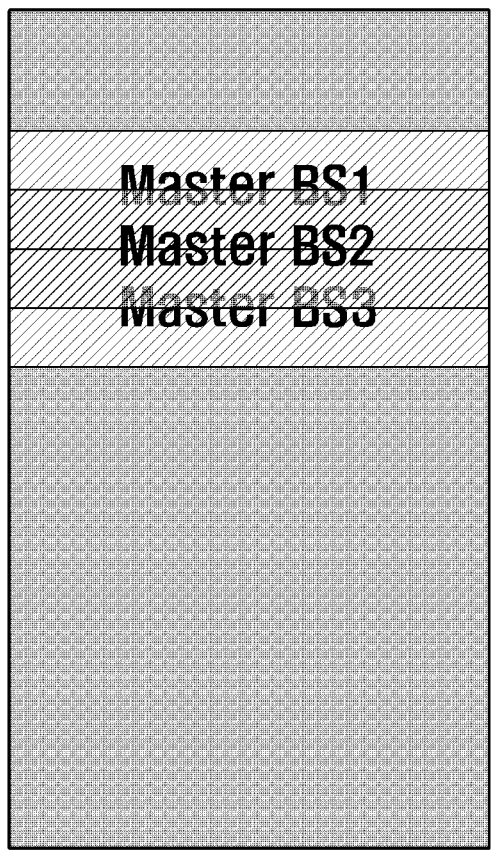
FIGS. 4A and 4B are diagrams illustrating principles of avoiding resource conflict occurring in a resource allocation negotiation procedure in a resource allocation method according to an embodiment of the present disclosure.
Figure 4B:

FIGS. 4A and 4B are diagrams illustrating principles of avoiding resource conflict occurring in a resource allocation negotiation procedure in a resource allocation method according to an embodiment of the present disclosure.

Referring to FIGS. 4A and 4B, the figures are directed to a method for overcoming the overlap of the resources requested by plural master BSs to a slave BS.

One BS may serve a group of MSs as the master BS and another group of MSs as the slave BS. If it belongs to more than one virtual cell, the BS may receive the resource allocation request message from the master BSs of the respective virtual cells.

In this case, the resource region to be allocated by the BS as the master BS and the resource region requested from other master BS may overlap. At this time, the slave BS may perform the conflict resolution to resolve the resource conflict situation.

That is, when the Nth BS (BS#N) receives the resource allocation requests from the three master BSs as shown in FIG. 4A, the BS#N may determine whether the requested resources are overlapped. If there is any overlapped resource region, the BS#N may control such that the requested resource regions are overlapped neither among each other, nor with the resource region available for the BS#N to allocate. Then, the BS#N notifies the master BSs requested for the resource allocation of the arbitrated RB (resource region) information.

Each of the master BSs may request the slave BSs to allocate resource to the MS based on the arbitrated resource allocation information, and the slave BS may accept or reject the request to avoid the conflict between the resource region to be allocated by the master BS and among the slave BSs.

If the master BS accepts the resource allocation region changed by the slave BS, the slave BS has to confirm at least partial or entire of the responded RBs. If the master BS changes the resource allocation again, the negotiation between the master and slave BSs for resource allocation to the MS may repeat infinitely, the master BS has to accept or reject the resource allocation finally to end the negotiation procedure.

The resource allocation request, the resource allocation response, and the resource allocation confirmation messages that are used in the negotiation procedure for resource allocation and conflict avoidance between the master and slave BSs in FIGS. 3 and 4A and 4B may include the following information. The information enumerated herein as the information carried in the above messages is information proposed in an embodiment of the present disclosure, but is not limited thereto.

Tables 1A and 1B show the information included in the resource allocation request message.

TABLE 1A

| Information | Description |
| --- | --- |
| Number of RBs | Information on number of RBs |
| RB index | Information on RB number |
| Frame or subframe index | Information on frame or subframe number as time resource information of physical layer |

Meanwhile, in the case that the master BS sends the slave BS the information on the data to be served to the MS cooperatively in the resource allocation request message, the following information may further be included.

TABLE 1B

| Information | Description |
| --- | --- |
| MAC unit data (optional) | ARQ sequence number or MAC PDU sequence number |

Table 2 shows the information included in the resource allocation response message. The information on the RBs accepted by the slave BS includes the information on the RBs replaced by the slave BS for conflict avoidance as well as the RBs requested by the master BS.

TABLE 2

| Information | Description |
| --- | --- |
| Resource allocation request accept/reject | Acknowledgement corresponding to resource allocation request |
| Number of accepted RBs | Information on number of RBs accepted by slave |
| Accepted RB index | Information on RB number accepted by slave |
| Accepted frame or subframe index | Information on frame or subframe number in RB |

Table 3A shows the information included in the resource allocation confirmation message. The confirmed resource allocation information, i.e., scheduling information, may be included in the response message transmitted from the master BS to the slave BS.

TABLE 3A

| Information | | Description |
| --- | --- | --- |
| Response message accept/reject | | Acknowledgement corresponding to response message of slave |
| Resource allocation information (physical layer scheduling information for transmitting data to MS using RB) | MCS | Modulation and Coding scheme information |
| | HARQ info | HARQ channel information |
| | Cooperative Transmission Scheme | Cooperative transmission scheme (Joint transmission) |
| | Beamforming | Multiple Antenna Transmission scheme (MIMO, Digital/Analog beamforming) |
| | Resource allocation information | Information on RB and radio frame or subframe |

Table 3B shows the information included in the scheduling message carrying the resource allocation information generated by the master BS based on the result of negotiation between the master and slave BSs. Unlike the legacy scheduling message carrying downlink and uplink scheduling information, this message includes plural BS IDs and per-BS resource allocation information as shown in Table 3B since plural BSs join the data transmission.

TABLE 3B

| Information | Description |
| --- | --- |
| MS ID | ID (identifier) of MS receiving or transmitting data |
| BS ID | IDs of BSs (master and slave) joining the cooperative communication |
| Per-BS resource allocation information | MCS, HARQ info., cooperative transmission scheme, beamforming scheme, and resource allocation information determined in Table 3A |

Figure 5A:
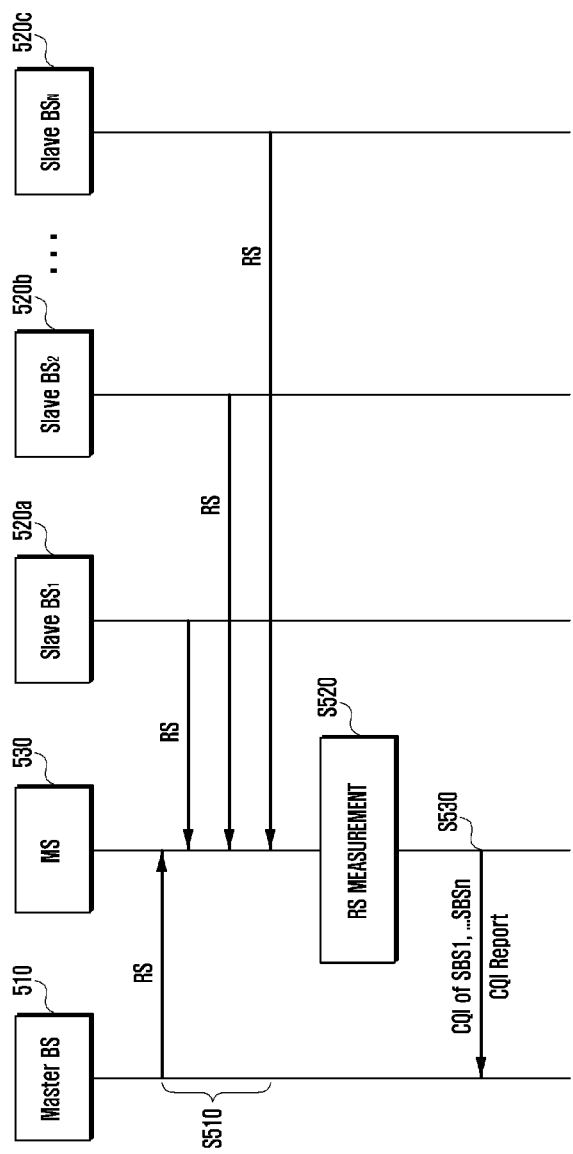
FIGS. 5A and 5B are signal flow diagrams illustrating a procedure for a master BS to acquire radio channel information between plural BSs of a virtual cell and an MS for supporting the resource allocation negotiation method of FIGS. 3, 4A, and 4B according to an embodiment of the present disclosure.
Figure 5B:
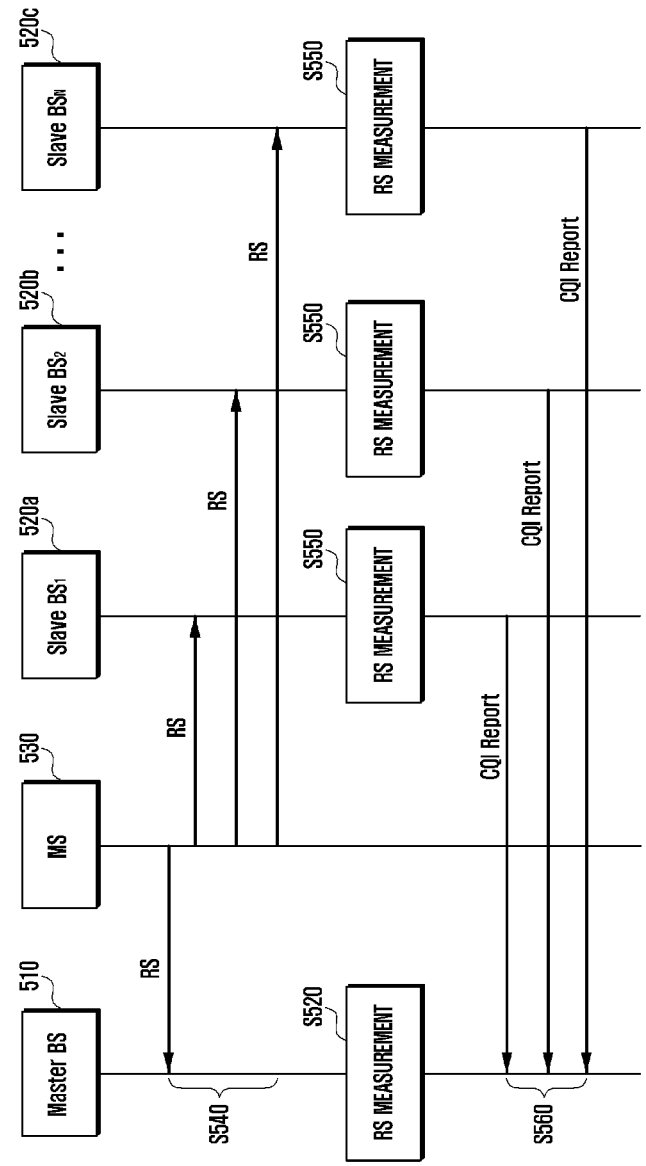

FIGS. 5A and 5B are signal flow diagrams illustrating a procedure for a master BS to acquire radio channel information between plural BSs of a virtual cell and an MS for supporting the resource allocation negotiation method of FIGS. 3, 4A, and 4B according to an embodiment of the present disclosure.

Referring to FIG. 5A, the figure is a signal flow diagram illustrating the procedure for the master BS to acquire radio channel information between the plural BSs of a virtual cell and the MS based on downlink reference signals according to an embodiment of the present disclosure.

In FIG. 5, each of the BSs 510, 520a, 520b, and 520c forming the virtual cell transmits Reference Signal (RS) including a digital bit sequence for radio channel estimation at operation S510. Then, the MS 530 receives and decodes the RS to measure the quality of the signal propagated over a radio channel at operation S520. The measured signal quality may be indicated by a Signal Strength, a SNR, or a SINR.

The signal quality measured by the MS 530 based on the RS is referred to as Channel Quality Information (CQI), and the MS 530 sends the BS-specific CQI information to the master BS 510 at operation S530.

Then, the master BS 510 reconfigures the virtual cell or assigns radio resource for cooperative communication to the respective slave BSs 520a, 520b, and 520c based on the BS-specific CQI information.

Referring to FIG. 5B, the figure is a signal flow diagram illustrating the procedure for the master BS to acquire radio channel information between the plural BSs of a virtual cell and the MS based on uplink reference signals according to an embodiment of the present disclosure.

In FIG. 5B, the MS 530 transmits Reference Signal (RS) including a digital bit sequence for radio channel estimation at operation S540. The BSs 510, 520a, 520b, and 520c receive and decode the RS to measure the quality of the signal propagated over a radio channel at operation S550. The measured signal quality may be indicated by a Signal Strength, a SNR, or a SINR.

The slave BSs 520a, 520b, and 520c among the BSs forming the virtual cell sends the measured CQIs to the master BS 510 at operation S560.

Figure 6:
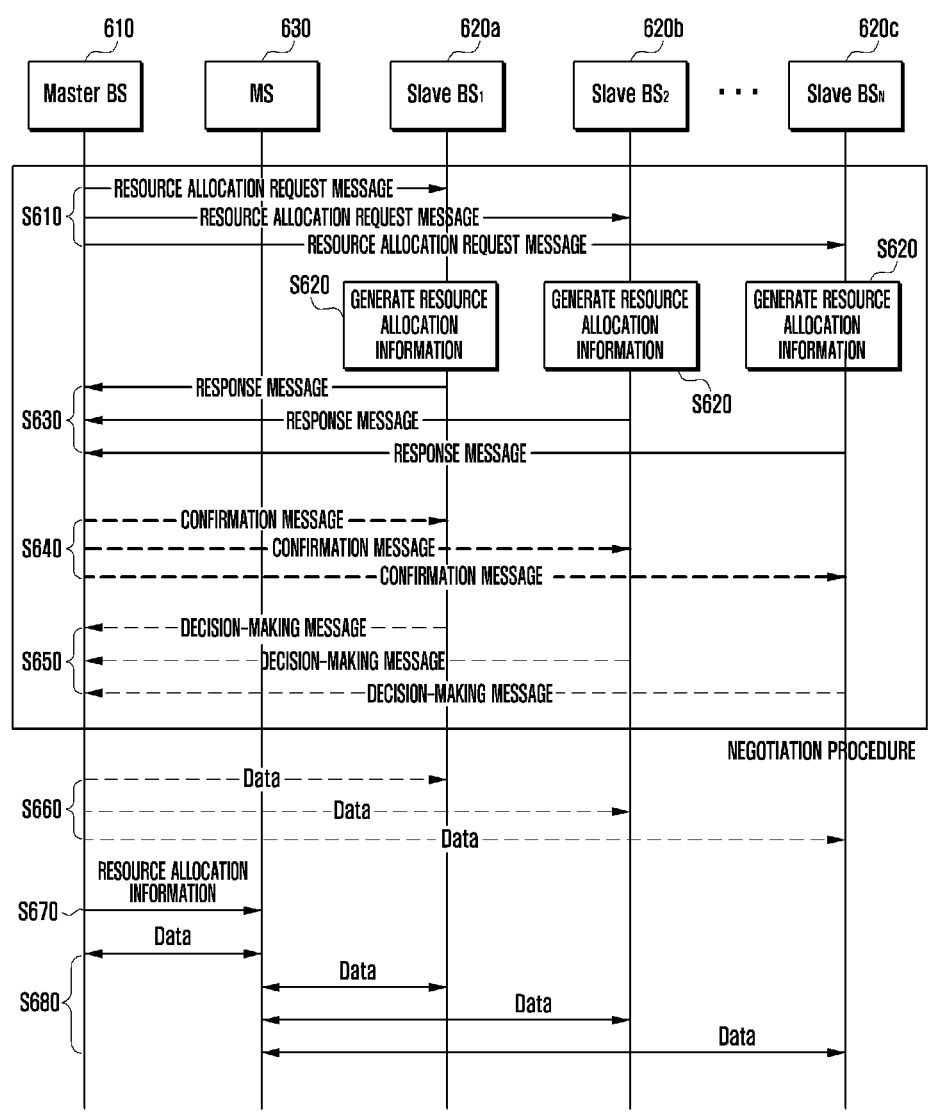
FIG. 6 is a signal flow diagram illustrating a resource allocation negotiation method for data transmission with a slave BSs' resources between master and slave BSs according to another embodiment of the present disclosure.

FIG. 6 is a signal flow diagram illustrating a resource allocation negotiation method for data transmission with a slave BSs' resources between master and slave BSs according to another embodiment of the present disclosure.

Referring to FIG. 6, in the virtual cell formed along with at least one BS, if one master BS and plural slave BSs exist, the master BS is capable of performing cooperative resource allocation to the MS as follows.

Although this embodiment is directed to the case where the master BS has the radio channel information between the MS and the respective BSs forming the virtual cell and the resource headroom information on the avail resources for data transmission, it is possible to perform the resource allocation negotiation with the slave BSs. The resource allocation negotiation is performed as follows.

The master BS 610 sends a resource allocation request message to the slave BSs 620a, 620b, and 620c at operation S610. The resource allocation request message may include the information on the data size for the master BS 610 to allocate the resource through the slave BSs 620a, 620b, and 620c. According to an embodiment of the present disclosure, the resource allocation request message may include a part or entire of the information on the data transmission scheme. According to an embodiment of the present disclosure, the master BS 610 may transmit the data itself addressed to the MS 630 through the cooperative transmission with the slave BSs 620a, 620b, and 620c.

That is, in the case that the resource allocation message includes the information on the data size or data transmission scheme, the data corresponding to the data size may be retained in the slave BS already or received from the master BS after the resource allocation negotiation other than at the current time of resource allocation request. In the case that the master BS transmits the data itself other than the resource allocation request message, the slave BS becomes aware of the size of the data and thus there is no need of transmitting the data size information in the resource allocation request message redundantly.

In the above-described embodiment, the master BS 610 sends the resource allocation request message or the data itself to request the slave BSs 620a, 620b, and 620c for cooperative communication resource allocation, and this may be referred to as transmissive data information herein. In this embodiment, the master BS 610 sends the slave BSs 620a, 620b, and 620c the transmissive data information to request for the cooperative communication resource allocation which includes the resource allocation request message or the data itself.

Afterward, each of the slave BSs 620a, 620b, and 620c sends a response message to the master BS 610 in response to the resource allocation request message or the data itself at operation S630. As a precondition for this, if the slave BS 620a, 620b, and 630c accept the resource allocation request, they generate the resource allocation information for the data transmission requested by the master BS 610. The slave BSs 620a, 620b, and 620c send the master BS 610 the response message including the resource allocation information. In the case that the resource allocation request message includes a part of data transmission scheme information or no data transmission scheme information, the response message may include a part or entire of the data transmission scheme information.

However, the resource allocation request of the master BS 610 is rejected, the slave BSs 620a, 620b, and 620c sends the response message indicating the reject to the master BS 610 in response to the resource allocation request message.

The master BS 610 receives the response message from the slave BSs 620a, 620b, and 620c in response to the resource allocation request message, generates, when the response message includes indication of accept, the final resource allocation information for the data to be transmitted to the MS based on the resource allocation information included in the response message, and sends the MS 630 the final resource allocation information at operation S670. Then, the MS 630 communicates data with the master and slave BSs 610, 620a, 620b, and 620c of the virtual cell based on the received resource allocation information at operation S680.

In the case that the response message received from the slave BS includes the indication of reject to the resource allocation request, the master BS 610 generates the final resource allocation information for data transmission to the MS with the exception of the resource allocation information on the rejected slave BS. The master BS 610 sends the MS 630 the final resource allocation information at operation S670. Then, the MS 630 communicates data with the master and slave BSs of the virtual cell, with the exception of the rejected slave BS, based on the received resource allocation information at operation S680.

In the above case, the resource allocation negotiation procedure between the master and slave BSs end at this operation.

However, the resource region of the RBs intended by the master BS 610 may conflict with the resource of the RBs indicated by the slave BSs 620a, 620b, and 620c depending on the cooperative transmission scheme. In this case, there is a need of transmitting a confirmation message to the slave BSs 620a, 620b, and 620c in response to the resource allocation response message. The resource region conflict and how to overcome the resource region conflict are described in detail later with reference to FIG. 7.

If it is necessary for the master BS 610 to send the slave BSs 620a, 620b, and 620c, the confirmation message additionally at operation S640, a resource conflict has occurred at the resource region intended by the master BS 610. The confirmation message transmitted from the master BS 610 to the slave BSs 620a, 620b, and 620c may include the information on when the response message is accepted or rejected. If the accept/reject information is included, the resource allocation negotiation procedure between the master and slave BSs end.

However, even when the master BS 610 accepts the response message, it is possible for the master BS 610 to modify the RB's resource allocation information in the response message for the reason of resource conflict. In this case, the RB's resource allocation information modified by the master BS 610 may be transmitted to the slave BSs in the confirmation message at operation S640. At this time, the master BS 610 has to receive a decision-making message including the final accept or reject in response to the confirmation message including the modified RB's resource allocation information from the respective slave BSs at operation S650.

From the view point of a slave BS, if the confirmation message is received from the maser BS 610, the slave BS checks the modified RB's resource allocation information included in the confirmation message and determines whether to accept or reject the modification. The slave BS sends the decision-making (acknowledgement) message including the indication of acceptance or rejection to the master BS 610 at operation S650.

The master BS 610 receives the decision-making message from the slave BSs and ends the resource allocation negotiation procedure between the master and slave BSs 610, 620a, 620b, and 620c.

If the resource allocation negotiation procedure between the master and slave BSs 610, 620a, 620b, and 620c ends, and if the slave BSs 620a, 620b, and 620c have no data to be transmitted to the MS 630, the master BS 610 may transmit the data to the slave BSs 610, 620a, 620b, and 620c at operation S660 after the end of the resource allocation negotiation procedure.

Afterward, the master BS 610 sends the MS 630 the final resource allocation information determined through the resource allocation negotiation procedure with one or more slave BSs 610, 620*a*, 620*b*, and 620*c* at operation S670. Then, the MS 630 is capable of radio data communication with plural BSs cooperatively.

Embodiments of the radio data transmission procedure are not described in detail herein. However, all available downlink and uplink cooperative communication of plural BSs can be applied in the present disclosure.

Figure 7A:
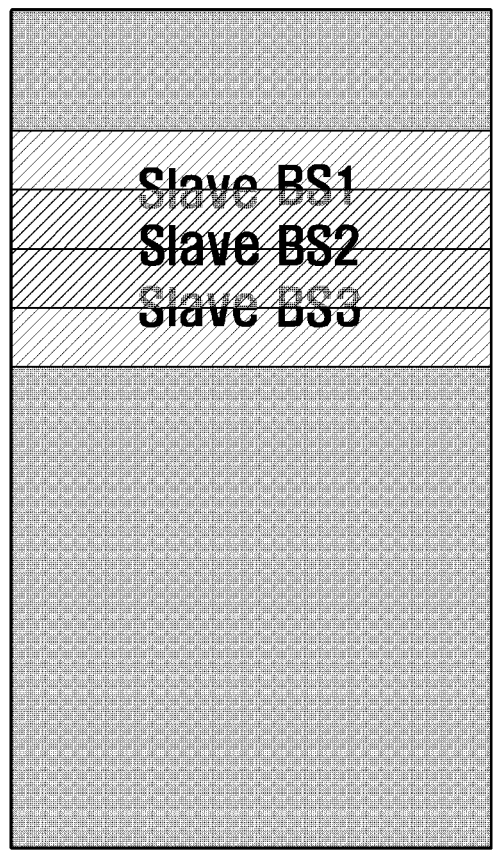
FIGS. 7A and 7B are diagrams illustrating principles of avoiding resource conflict occurring in a resource allocation negotiation procedure in a resource allocation method according to another embodiment of the present disclosure.
Figure 7B:
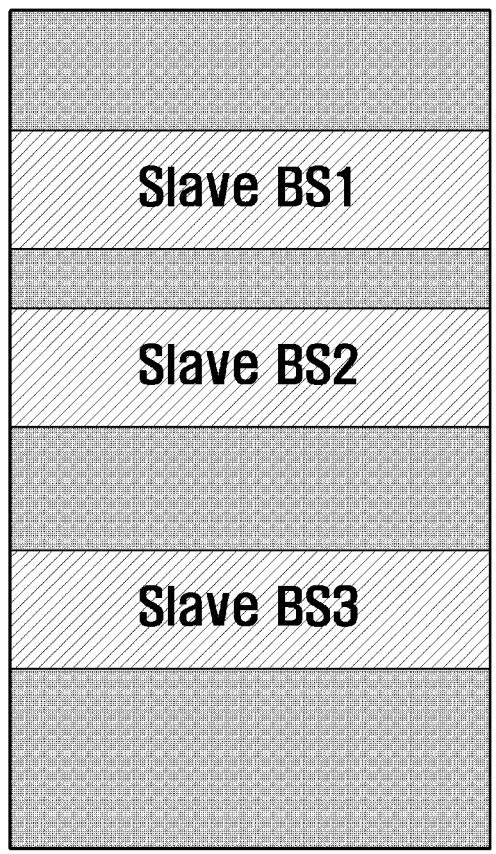

FIGS. 7A and 7B are diagrams illustrating principles of avoiding resource conflict occurring in a resource allocation negotiation procedure in a resource allocation method according to another embodiment of the present disclosure.

Referring to FIGS. 7A and 7B, the figures are directed to the method for overcoming the overlap of the resources requested by plural slave BSs to the master BS.

A BS may serve a group of MSs as the master BS and another group of MSs as a slave BS in a virtual cell. If it belongs to one or more virtual cells, the master BS receives the resource allocation request message from the slave BSs of plural virtual cells as described with reference to FIG. 6.

When the master BS intends to user a resource region composed of RBs different from those of the slave BSs for transmitting data to the MS, the master BS's resource region may overlap with the resource region of the RBs indicated in the response message from the slave BSs or the resource regions of RBs of slave BSs overlap among each other.

At this time, the BS may perform the conflict resolution to resolve the resource conflict situation.

Referring to FIG. 7A, the Nth BS (BS#N) checks the resource allocation information included in the resource allocation response message from the three slave BSs to determine whether the resource regions are overlapped. If there is any overlap between the resource regions, the BS#N may control such that the requested resource regions are overlapped neither among each other nor with the resource region available for the BS#N to allocate.

Then, in embodiments, the BS#N notifies the slave BSs of the arbitrated RB (resource region) information. If the slave BS received the resource allocation information modified by the BS#N, i.e., the master BS modifies the resource allocation information again, the negotiation between the master and slave BSs for resource allocation to the MS may repeat infinitely, and the slave BS has to accept or reject the resource allocation finally to end the negotiation procedure.

The resource allocation request, the resource allocation response, the resource allocation confirmation, and the decision-making messages that are used in the negotiation procedure for resource allocation and conflict avoidance between the master and slave BSs in FIGS. 6 and 7A and 7B may include the following information according to an embodiment of the present disclosure.

Table 4 shows the information included in the resource allocation request message.

TABLE 4

| Information | Description |
| --- | --- |
| Data size | Information on the size (byte) of data to be transmitted to the MS through cooperative communication between master and slave BSs |
| Data transmission scheme | Data transmission information including MCS, HARQ info, Cooperative transmission scheme, Beamforming scheme, etc. |

Table 5 shows the information included in the resource allocation response message.

TABLE 5

| Information | Description |
| --- | --- |
| Resource allocation request accept/reject | Acknowledgement corresponding to resource allocation request |
| RB index | Accepted RB number information |
| Frame or subframe index | Frame or subframe information of accepted RB |
| Data transmission scheme | Data transmission scheme information including MCS, HARQ info, Cooperative transmission scheme, Beamforming scheme, etc. |

Table 6 shows the information included in the resource allocation confirmation message.

TABLE 6

| Information | Description |
| --- | --- |
| Response message accept/reject | Acknowledgement corresponding to information included in response message from slave BS |
| RB index | RB number information changed by master BS |
| Frame or subframe index | Frame or subframe number information of RB changed by master BS |

Table 7 shows the information included in the decision-making message.

TABLE 7

| Information | Description |
| --- | --- |
| Confirmation message accept/reject | Acknowledgement corresponding to information included in the confirmation message from master BS |

Figure 8A:
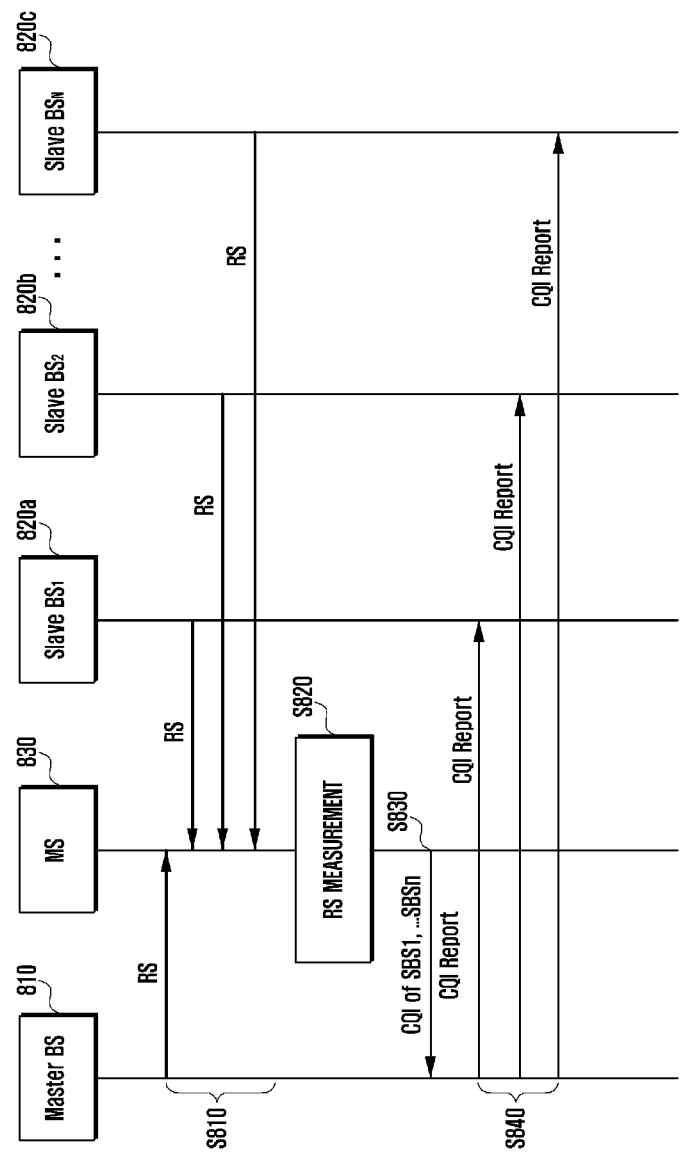
FIGS. 8A and 8B are signal flow diagrams illustrating a procedure of acquiring radio channel information between MS and master and slave BSs based on a downlink reference signal according to another embodiment of the present disclosure.
Figure 8B:
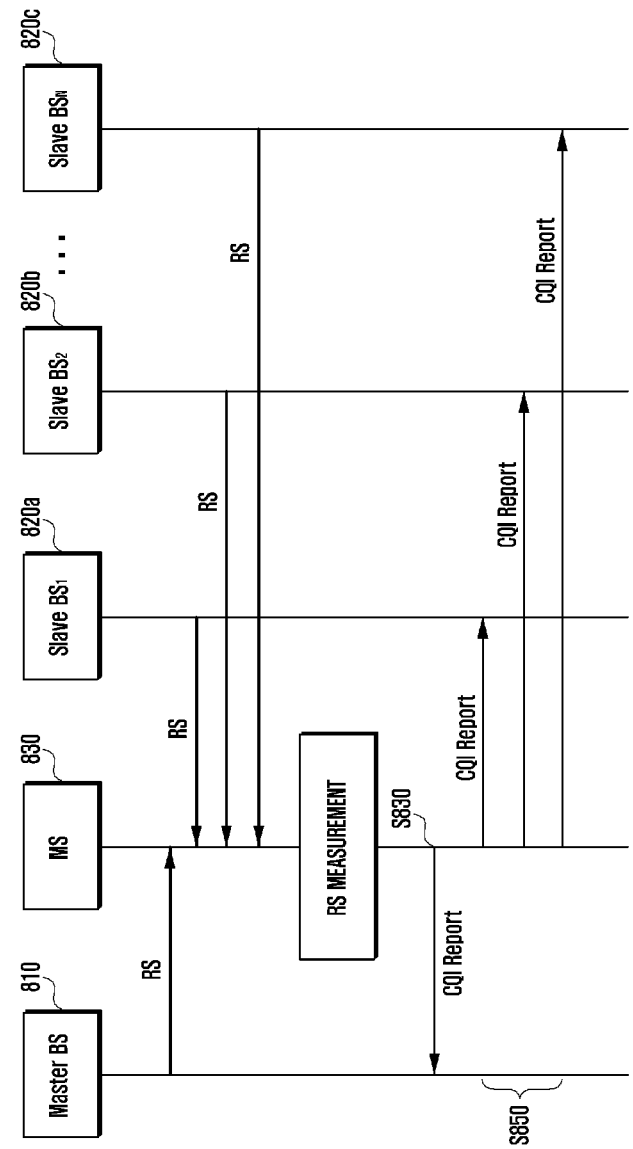

FIGS. 8A and 8B are signal flow diagrams illustrating a procedure of acquiring radio channel information between MS and master and slave BSs based on a downlink reference signal according to another embodiment of the present disclosure.

Referring to FIG. 8A, the figure is a signal flow diagram illustrating the procedure of acquiring the radio channel information between MS and plural BSs forming a virtual cell based on downlink reference signal according to an embodiment of the present disclosure.

Each of the BSs 810, 820*a*, 820*b*, and 820*c* forming the virtual cell transmits Reference Signal (RS) including a digital bit sequence for radio channel estimation at operation S810. Then, the MS 830 receives and decodes the RS to measure the quality of the signal propagated over a radio channel at operation S820. The measured signal quality may be indicated by a Signal Strength, a SNR, or a SINR. The signal quality measured by the MS 830 based on the RS is referred to as CQI.

The MS 830 sends the BS-specific CQI information to the master BS 810 at operation S530. Then, the master BS 810 sends the BS-specific CQI information to the slave BSs 820*a*, 820*b*, and 820*c* at operation S840.

Referring to FIG. 8B, the figure is a signal flow diagram illustrating the procedure for acquiring radio channel information between MS and plural BSs forming a virtual cell based on downlink reference signals according to another embodiment of the present disclosure.

The radio channel information acquisition procedure of FIG. 8B differs from that of FIG. 8A in that the MS 830 reports the BS-specific CQI information to the respective BSs directly at operation S850 rather than reports to only the master BS 810.

Since the radio channel information acquisition procedures of FIGS. 8A and 8B are identical with each other with the exception of this operation of reporting the CQI information, detailed description thereon is omitted herein.

Figure 9A:
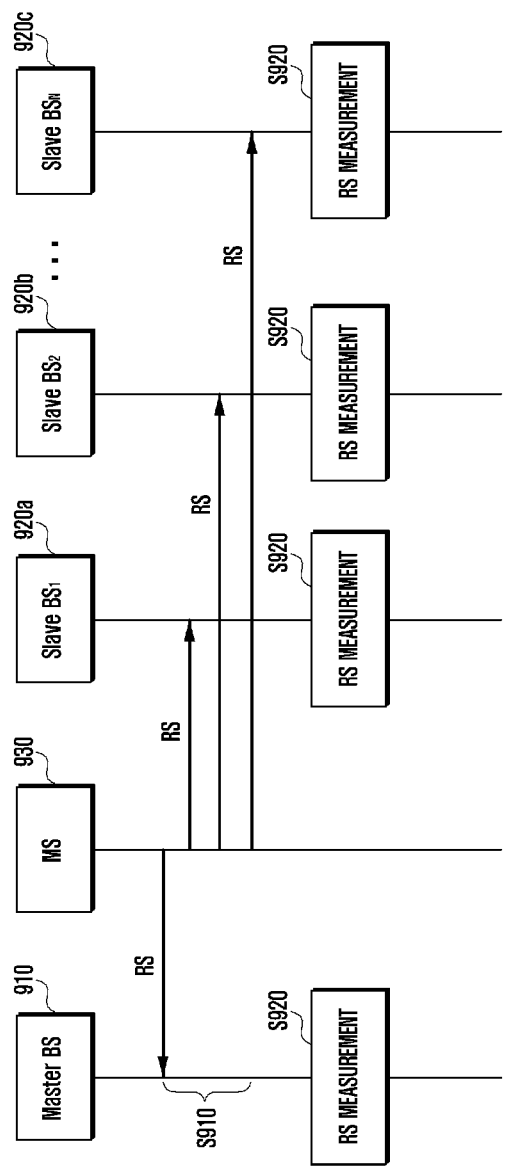
FIGS. 9A and 9B are signal flow diagrams illustrating a procedure of acquiring radio channel information between MS and master and slave BSs based on an uplink reference signal according to another embodiment of the present disclosure.
Figure 9B:
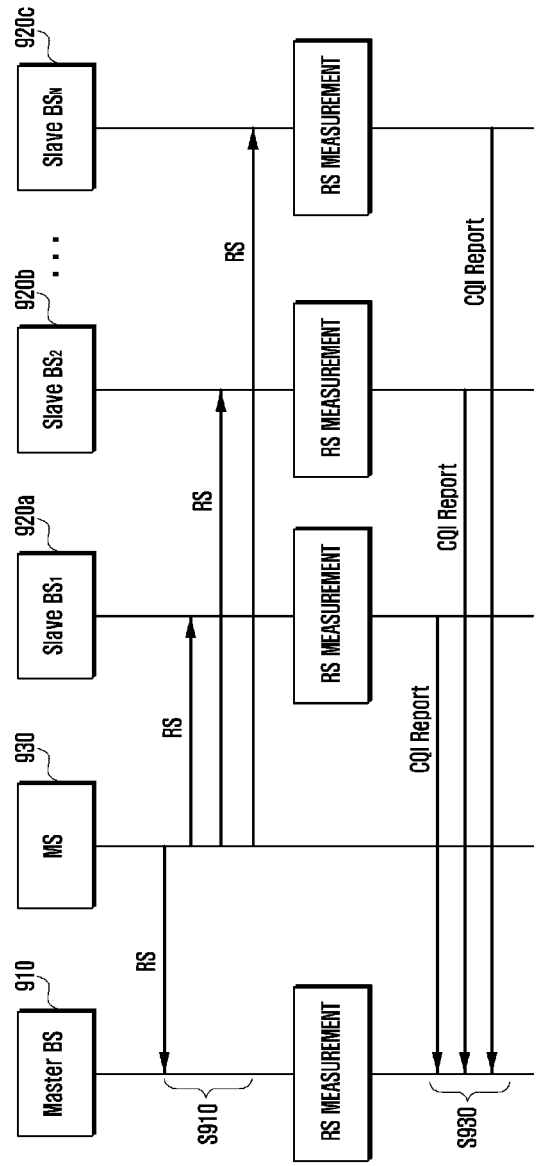

FIGS. 9A and 9B are signal flow diagrams illustrating a procedure of acquiring radio channel information between MS and master and slave BSs based on an uplink reference signal according to another embodiment of the present disclosure.

Referring to FIG. 9A, the figure is a signal flow diagram illustrating the procedure of acquiring radio channel information between MS and master and slave BSs forming a virtual cell according to another embodiment of the present disclosure.

The MS 930 transmits Reference Signal (RS) including a digital bit sequence for radio channel estimation at operation S910. Then, the BSs 910, 920*a*, 920*b*, and 920*c* receive and decode the RS to measure the quality of the signal propagated over a radio channel at operation S920. The measured signal quality may be indicated by a Signal Strength, a SNR, or a SINR.

Referring to FIG. 9B, the figure is a signal flow diagram illustrating the procedure of acquiring radio channel information between MS and maser and slave BSs forming a virtual cell according to another embodiment of the present disclosure.

The radio channel information acquisition procedure of FIG. 9B differs from that of FIG. 9A in that the CQI information measured by the slave BSs 920*a*, 920*b*, and 920*c* are reported to the master BS at operation S930.

Figure 10:
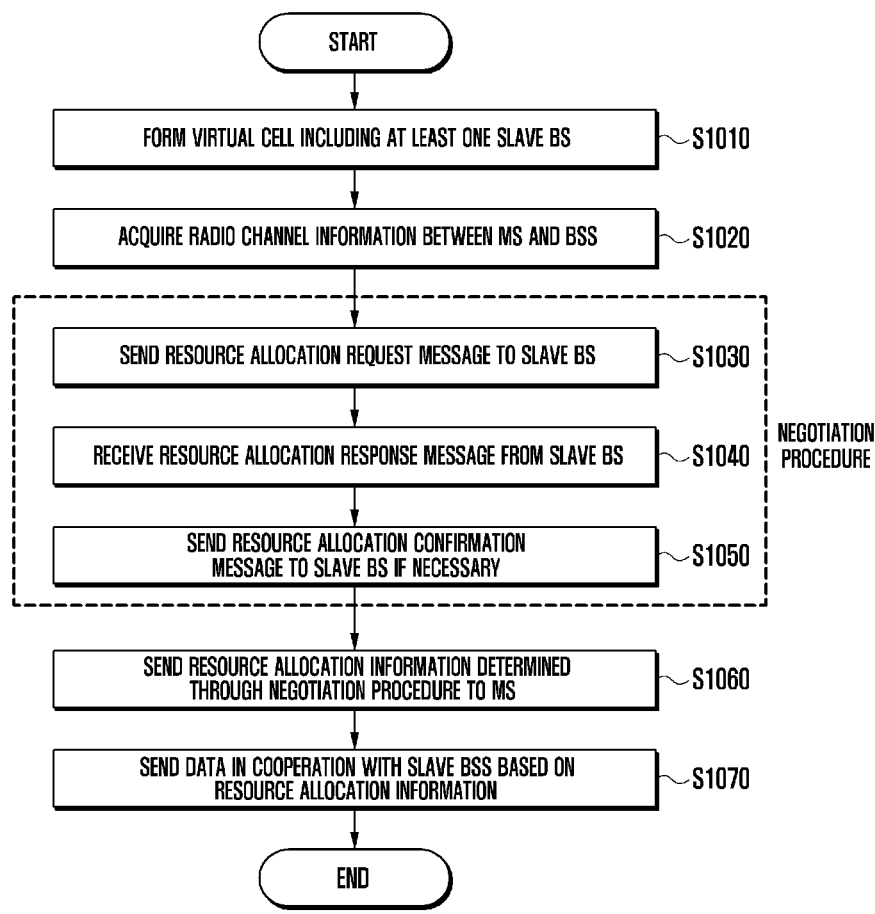
FIG. 10 is a flowchart illustrating a master BS procedure of a resource allocation method according to an embodiment of the present disclosure.

FIG. 10 is a flowchart illustrating a master BS procedure of a resource allocation method according to an embodiment of the present disclosure.

Referring to FIG. 10, the master BS first forms a virtual cell with at least one slave BS at operation S1010. The virtual cell is formed such that the master and slave BSs communicate data with the MS cooperatively. Although the master BS is the BS to which the MS has performed network entry procedure in the above description, the present disclosure is not limited thereto.

Next, the master BS acquires radio channel information between the MS and the respective BSs at operation S1020. The radio channel information may be CQI measured by the MS. In embodiments, the master BS may be capable of receiving the CQIs measured by the MS for the respective slave BSs in downlink and the CQIs measured by the respective slave BSs in uplink.

In embodiments, the master BS may perform resource allocation negotiation procedure with the slave BSs under the assumption that it has the radio channel information between the MS and the respective BSs forming the virtual cell and the resource headroom information of the slave BSs.

For this purpose, the master BS sends the slave BSs the resource allocation request message including the information on the resource which recommended for the slave BSs to allocate to the MS at operation S1030.

Next, the master BS receives the resource allocation response message including the information on whether to accept or reject the resource allocation request at operation S1040. If necessary, the master BS sends the slave BS a resource allocation confirmation message at operation S1050. In this case, the resource allocation confirmation message may include the information on whether to accept or reject the resource allocation response message finally.

Next, the master BS sends the MS the resource allocation information determined through resource allocation negotiation procedure with the slave BSs at operation S1060.

Then, the master BS transmits the data to the MS in cooperation with the slave BSs based on the resource allocation information at operation S1070.

Figure 11:
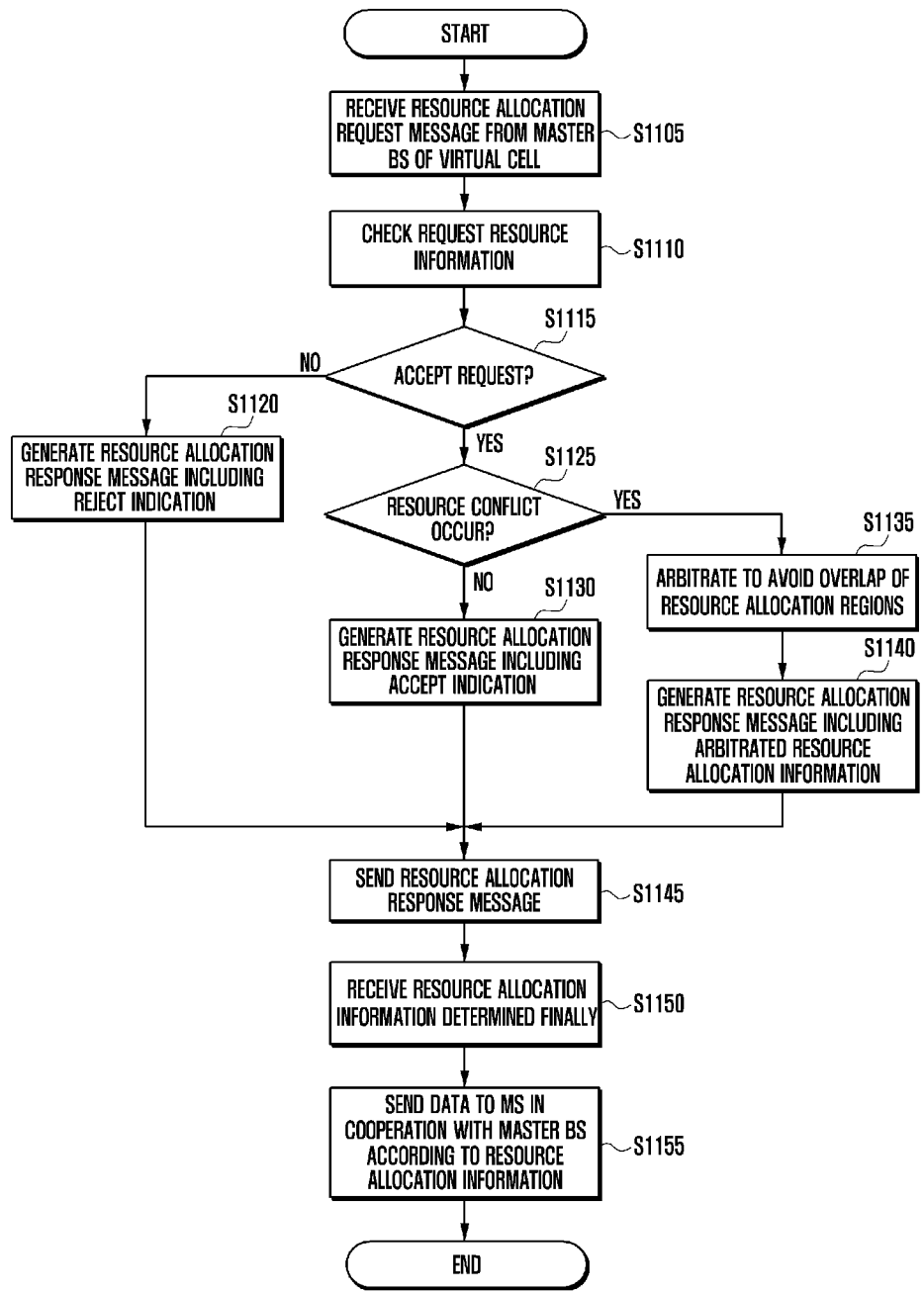
FIG. 11 is a flowchart illustrating a slave BS procedure in a resource allocation method according to an embodiment of the present disclosure.

FIG. 11 is a flowchart illustrating a slave BS procedure in a resource allocation method according to an embodiment of the present disclosure.

Referring to FIG. 11, the slave BS first receives a resource allocation request message from the master BS of the virtual cell at operation S1105. Next, the slave BS checks the resource requested by the master at operation S1110.

The slave BS determines whether to accept the resource allocation request entirely or partially or reject the resource allocation request in consideration of its resource headroom status, conflict between the resource reserved for other MSs and the resource requested by the master BS, and radio channel status at operation S1115.

If it is determined to reject the request, the slave BS generates a resource allocation response message including the reject indication at operation S1120 and sends the resource allocation response message to the master BS at operation S1145.

Otherwise, if it is determined to accept the resource allocation request from the master BS at operation S1115, the slave BS determines whether there is any conflict between the resources requested by plural master BSs at operation S1125. If there is no conflict, the slave BS generates the resource allocation response message including accept indication at operation S1130 and sends the resource allocation response message to the master BS at operation S1145.

Otherwise, if there is any conflict, the slave BS arbitrates to resolve the resource conflict at operation S1135 and generates the resource allocation response message including the arbitrated resource allocation information at operation S1140. The slave BS sends the resource allocation response message to the master BS at operation S1145.

According to an embodiment of the present disclosure, the slave BS may receive a resource allocation confirmation message including the master BS's final decision on whether to accept or reject the resource allocation arbitrated by the slave BS (not shown), the confirmation message being transmitted in response to the response message.

After transmitting the resource allocation response message, the slave BS receives the finally decided resource allocation information from the master BS at operation S1150. Then, the slave BS serves the MS in cooperation with the master BS based on the received resource allocation information in operation S1155.

Figure 12:
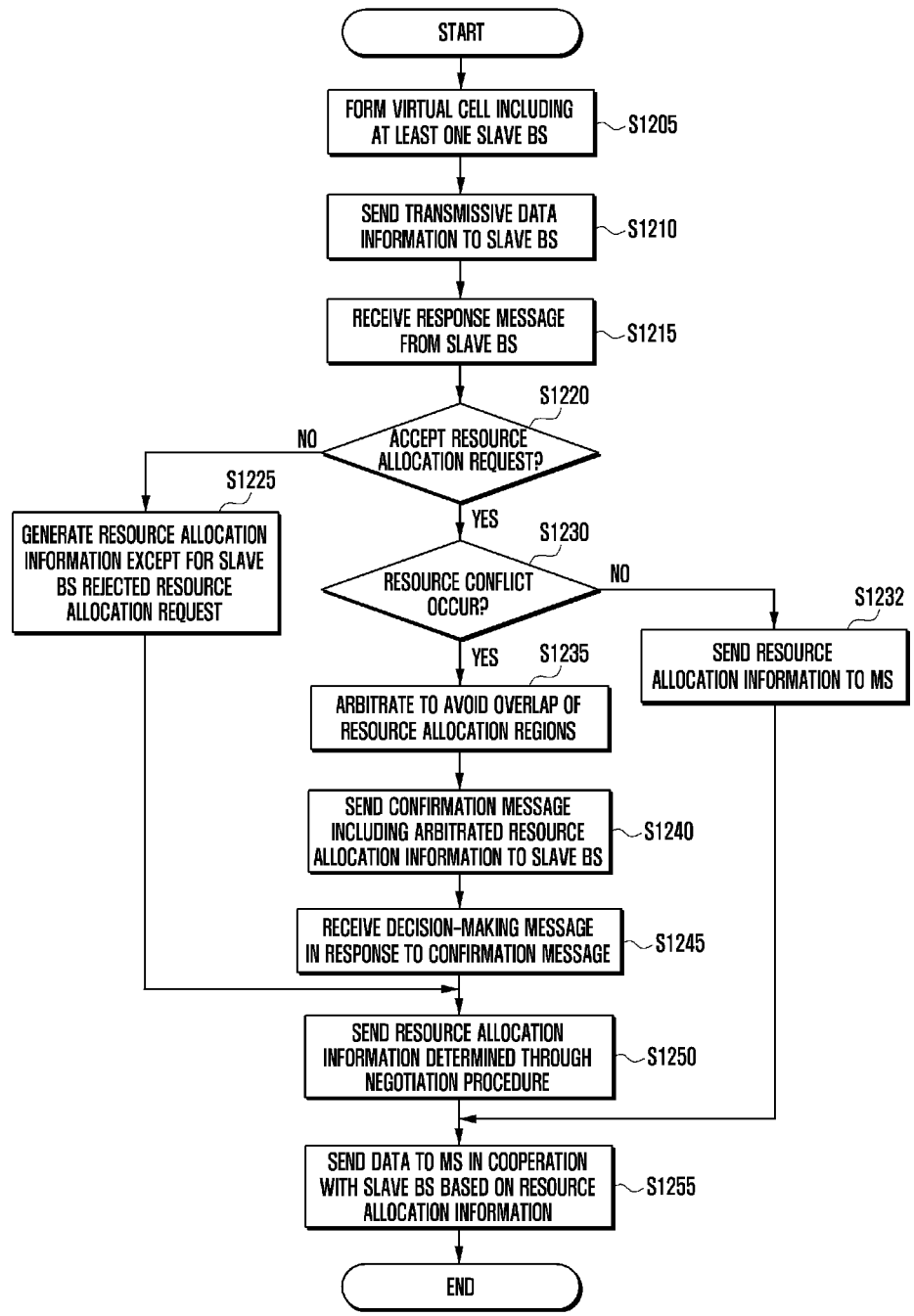
FIG. 12 is a flowchart illustrating a master BS procedure in a resource allocation method according to an embodiment of the present disclosure.

FIG. 12 is a flowchart illustrating a master BS procedure in a resource allocation method according to an embodiment of the present disclosure.

Referring to FIG. 12, the embodiment reflected therein differs from the embodiment in FIG. 10. In the embodiment of FIG. 10, the master BS requests the slave BS to allocate the resource recommended by the master BS to the MS. In the embodiment of FIG. 12, the master BS sends the slave BS only the information on the data addressed to the MS to be served cooperatively (data size and transmission scheme) and thus the resource allocation procedure is dominated by the slave BS.

In FIG. 12, the master BS forms a virtual cell with at least one slave BS at operation S1205.

The master BS sends the slave BS the transmissive data information at operation S1210. The transmissive data information may be the allocation request message including the information on the size of data to be transmitted to the MS. The resource allocation request message may include the information on the data transmission scheme entirely or partially. According to an embodiment of the present disclosure, the transmissive data information may be the data itself to be transmitted to the MS.

The master BS receives the resource allocation response message from the slave BS and checks the content of the response message at operation S1215.

The master BS determines whether the response message includes the indication of accepting the resource allocation request at operation S1220. If the resource allocation request is rejected, the master BS generates the resource allocation information in which the slave BS rejected the resource allocation request is ruled out at operation S1225.

Otherwise, if the resource allocation request is accepted, the master BS determines whether there is any conflict among the resources accepted by the plural slave BSs at operation S1230. If no resource conflict occurs, the master BS generates the final resource allocation information and sends it to the MS at operation S1232.

If there is any resource conflict, the master BS arbitrates to avoid overlap among the resource regions recommend by the slave BSs at operation S1235. Then, the master BS transmits the confirmation message including the arbitrated resource allocation information to the slave BSs.

Next, in operation S1245, the master BS receives the decision-making message from the slave BSs in response to the confirmation message sent including the arbitrated resource allocation in operation S1240.

Through this, the resource allocation negotiation procedure between the master and slave BSs ends, and the master BS sends the MS the resource allocation information determined through the negotiation procedure at operation S1250.

Finally, the master BS serves the data communication of the MS in cooperation with the slave BSs based on the resource allocation information at operation S1255.

Figure 13:
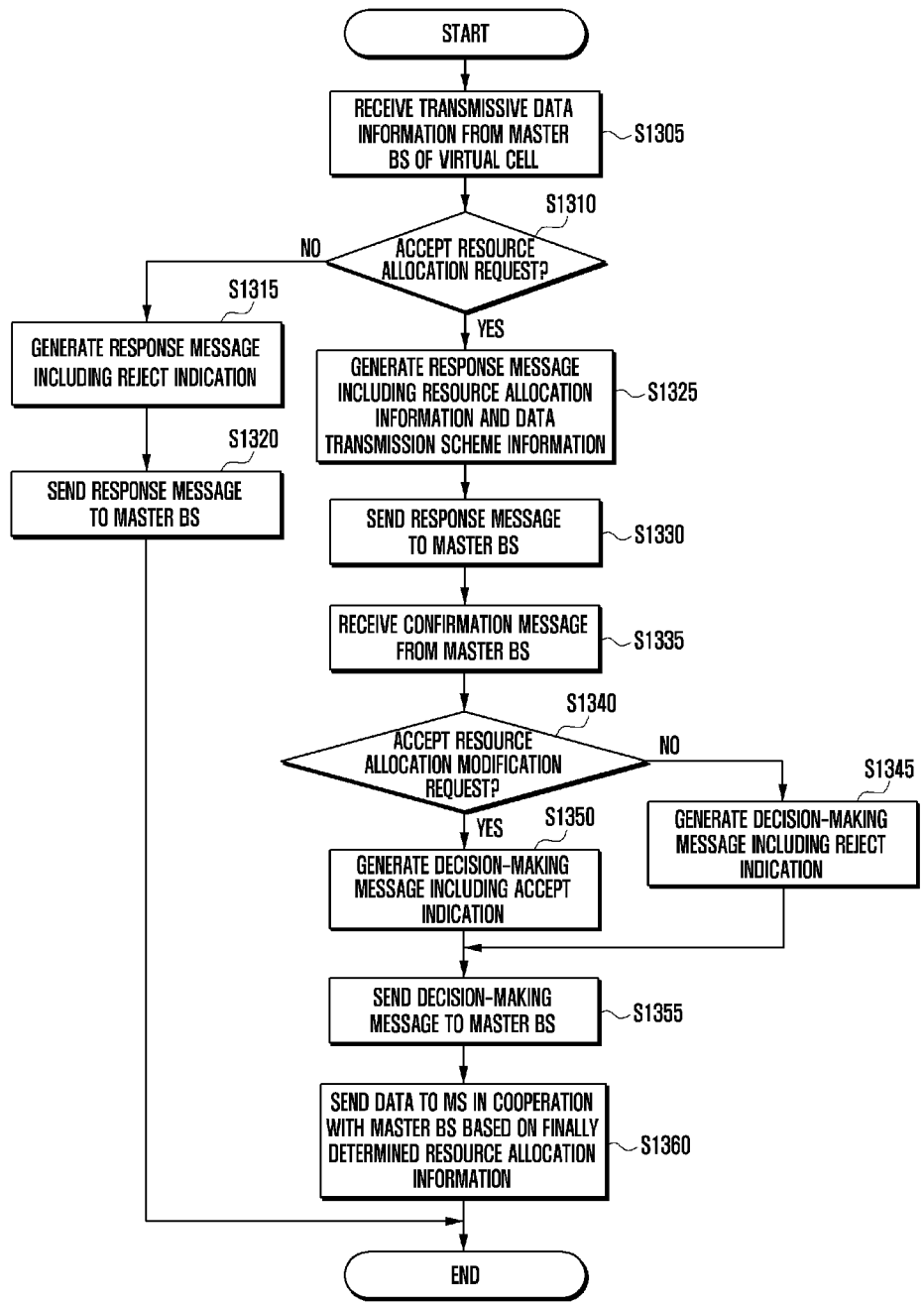
FIG. 13 is a flowchart illustrating a slave BS procedure in a resource allocation method according to another embodiment of the present disclosure.

FIG. 13 is a flowchart illustrating a slave BS procedure in a resource allocation method according to another embodiment of the present disclosure.

Referring to FIG. 13, the slave BS receives the transmissive data information from the master BS of the virtual cell at operation S1305. The transmissive data information may be the resource allocation request message including the information on the size of data to be transmitted to the MS and data transmission scheme. The transmissive data information may be the data itself to be transmitted to the MS.

Then, the slave BS determines whether to accept or reject the resource allocation request from the master BS at operation S1310. If it is determined to reject the resource allocation request, the master BS generates the resource allocation response message including the reject indication at operation S1315 and sends the master BS the resource allocation response message at operation S1320.

If it is determined to accept the resource allocation request, the slave BS generates the resource allocation response message including the resource allocation information and data transmission scheme information at operation S1325. The slave BS sends the master BS the resource allocation response message at operation S1330.

In the case that the resource region of the RBs indicated in the resource allocation information generated by the plural slave BSs conflict, the slave BS may receive a resource allocation confirmation message to resolve the conflict at operation S1335. Then, the slave BS determines whether to accept or reject the resource allocation modification request included in the confirmation message at operation S1340.

If it is determined to reject the resource allocation modification request of the master BS, the slave BS generates the decision-making message including the reject indication at operation S1345. Next, the slave BS sends the master BS the decision-making message at operation S1355.

Otherwise, if it is determined to accept the resource allocation modification request of the master BS, the slave BS generates the decision-making message including the accept indication at operation S1350. Next, the slave BS sends the master BS the decision-making message at operation S1355.

Finally, the slave BS transmits data to the MS in cooperation with the master BS and other slave BSs according to the final resource allocation information at operation S1360.

Figure 14:
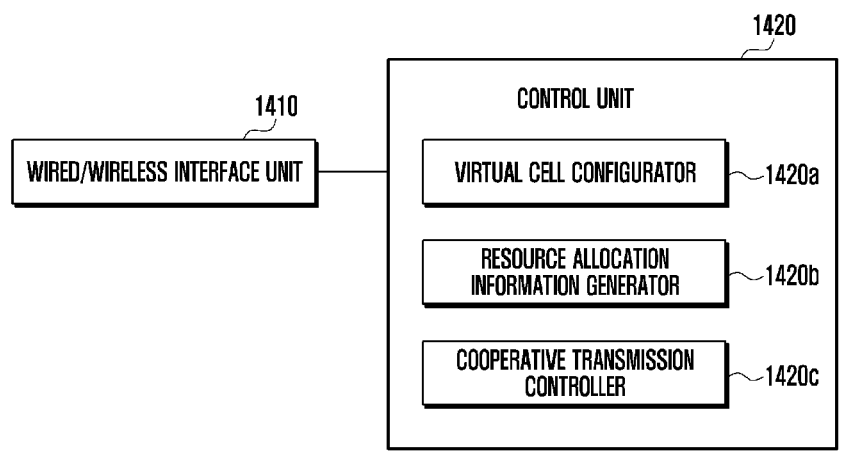
FIG. 14 is a block diagram illustrating a configuration of a master BS according to an embodiment of the present disclosure.

FIG. 14 is a block diagram illustrating a configuration of a master BS according to an embodiment of the present disclosure.

Referring to FIG. 14, the wired/wireless interface unit 1410 provides a wired and/or wireless interface for the master BS to communicate with the MS or a higher layer network node through wired or wireless channel. In detail, the wireless interface is provided with a physical means for the master BS to communicate control signal and data with the MS through radio communication, and the wired interface is provided with a wired communication means connected to a neighbor BS, a Mobility Management Entity (MME), and a Serving Gateway.

According to an embodiment of the present disclosure, the control unit 1420 controls such that the master BS forms a virtual cell with plural slave BSs. The control unit 1420 controls to generate the resource allocation information through resource allocation negotiation procedure with the slave BSs and provides the data communication service to the MS in cooperation with the slave BSs. In order to accomplish this, the control unit 1420 includes a virtual cell configurator 1420a, a resource allocation information generator 1420b, and a cooperative transmission controller 1420c.

The virtual cell configurator 1420a configures a virtual cell including the master BS and at least one slave BS. The BSs forming the virtual cell may communication data with the MS cooperatively in a diversity manner or a multiplexing manner. As described above, the master BS may be the BS to which the MS has performed the network entry process, but not limited thereto.

The resource allocation information generator 1420b performs resource allocation negotiation procedure with the slave BSs for providing cooperative data communication service to the MS. In order to accomplish this, the resource allocation information generator 1420b sends the respective slave BSs the resource allocation request message including the information on the resource for the slave BSs to allocate the MS. The resource allocation information generator 1420b receives the resource allocation response message including the accept or reject indication from the slave BSs in response to the resource allocation request message. The resource allocation information generator 1420b transmits the resource allocation confirmation message, if necessary. In this case, the resource allocation confirmation message may include the information whether to accept or reject the resource allocation response message transmitted by the slave BSs. The resource allocation information generator 1420b controls to send the MS the resource allocation information determined through the negotiation procedure with the slave BSs.

The cooperative transmission controller 1420c controls the master BS to transmit the data to the MS in cooperation with the slave BSs according to the resource allocation information.

Figure 15:
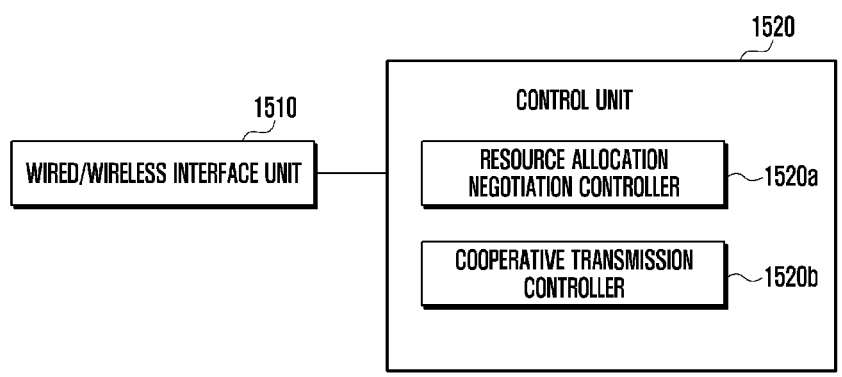
FIG. 15 is a block diagram illustrating a configuration of a slave BS according to an embodiment of the present disclosure.

FIG. 15 is a block diagram illustrating a configuration of a slave BS according to an embodiment of the present disclosure.

Referring to FIG. 15, the wired/wireless interface unit 1510 provides a wired and/or wireless interface for the slave BS to communicate with the MS or a higher layer network node through wired or wireless channel. In detail, the wireless interface is provided with a physical means for the slave BS to communicate control signal and data with the MS through radio communication, and the wired interface is provided with a wired communication means connected to a neighbor BS, a Mobility Management Entity (MME), and a Serving Gateway.

The control unit 1520 controls the resource allocation negotiation procedure with the master BS and service provision to the MS in cooperation with the master BS based on the negotiated resource allocation information. In order to accomplish this, the control unit 1520 includes a resource allocation negotiation controller 1520a and a cooperative transmission controller 1520b.

If the resource allocation request message is received from the master BS, the resource allocation negotiation controller 1520a checks the resource requested by the master BS. The resource allocation negotiation controller 1520a may determine whether to accept the resource allocation request entirely or partially, or may reject the resource allocation request in consideration of its resource headroom status, a conflict between the resource reserved for other MSs and the resource requested by the master BS, and a radio channel status.

If it is determined to reject the request, the resource allocation negotiation controller 1520a generates a resource allocation response message including the reject indication and controls the slave BS to send the resource allocation response message to the master BS.

Otherwise, if it is determined to accept the resource allocation request from the master BS, the resource allocation negotiation controller 1520a determines whether there is any conflict between the resources requested by plural master BSs. If there is no conflict, the resource allocation negotiation controller 1520a generates the resource allocation response message including accept indication and controls the slave BS to send the resource allocation response message to the master BS.

If there is any resource conflict, the resource allocation negotiation controller 1520a may arbitrate to resolve the resource conflict and generates the resource allocation response message including the arbitrated resource allocation information. The resource allocation negotiation controller 1520 controls the slave BS to send the resource allocation response message to the master BS.

The cooperative transmission controller 1520b controls the slave BS to transmit data to the MS in cooperation with the master BS and other slave BSs based on the resource allocation information received from the master BS.

Figure 16:
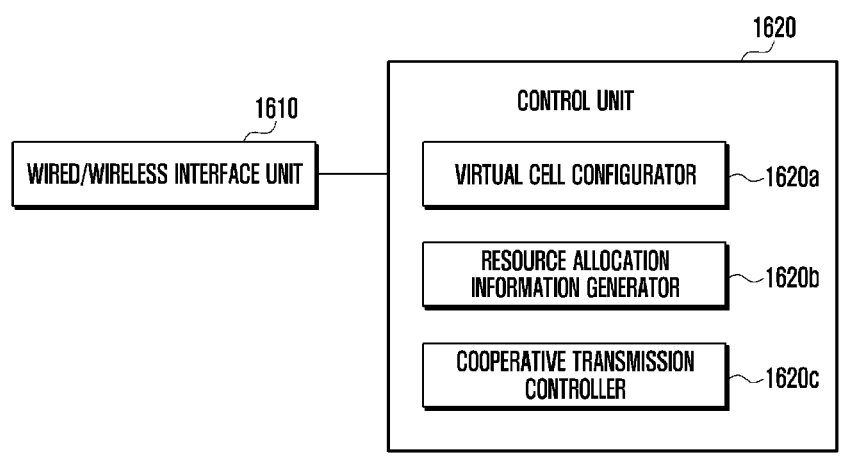
FIG. 16 is a block diagram illustrating a configuration of a master BS according to another embodiment of the present disclosure.

FIG. 16 is a block diagram illustrating a configuration of a master BS according to another embodiment of the present disclosure.

Referring to FIG. 16, the wired/wireless interface unit 1610 provides a wired and/or wireless interface for the master BS to communicate with the MS or a higher layer network node through wired or wireless channel. In detail, the wireless interface is provided with a physical means for the master BS to communicate control signal and data with the MS through radio communication, and the wired interface is provided with a wired communication means connected to a neighbor BS, a Mobility Management Entity (MME), and a Serving Gateway.

According to an embodiment of the present disclosure, the control unit 1620 controls such that the master BS forms a virtual cell with plural slave BSs. The control unit 1620 controls to generate the resource allocation information through resource allocation negotiation procedure with the slave BSs and provides the data communication service to the MS in cooperation with the slave BSs. In order to accomplish this, the control unit 1620 includes a virtual cell configurator 1620a, a resource allocation information generator 1620b, and a cooperative transmission controller 1620c.

The virtual cell configurator 1620a configures a virtual cell including the master BS and at least one slave BS. The BSs forming the virtual cell may communication data with the MS cooperatively in a diversity manner or a multiplexing manner. As described above, the master BS may be the BS to which the MS has performed the network entry process, but not limited thereto.

The resource allocation information generator 1620b sends the slave BSs the transmissive data information. The transmissive data information may be the allocation request message including the information on the size of data to be transmitted to the MS. The transmissive data information may also be the data itself to be transmitted to the MS.

The resource allocation information generator 1620b receives the resource allocation response message and checks the content of the response message. If it is determined that the resource allocation request is rejected, the resource allocation negotiation controller 1620 generates the resource allocation information in which the slave BS rejected the resource allocation request is ruled out.

Otherwise, if it is determined that the resource allocation request is accepted, the resource allocation negotiation controller 1620b determines whether there is any conflict among the resources accepted by the plural slave BSs. If no resource conflict occurs, the resource allocation negotiation controller 1620b generates the final resource allocation information to the MS. If there is any resource conflict, resource allocation negotiation controller 1620b may arbitrate to avoid overlap among the resource regions recommend by the slave BSs. Then, the resource allocation negotiation controller 1620b transmits the confirmation message including the arbitrated resource allocation information to the slave BSs. Afterward, the resource allocation negotiation controller 1620b receives the decision-making message from the slave BSs in response to the confirmation message.

The resource allocation negotiation controller 1620b may send the MS the resource allocation information determined finally through the above procedure.

The cooperative transmission controller 1620c controls the master BS to transmit data to the MS in cooperation with the slave BSs based on the finally determined resource allocation information.

Figure 17:
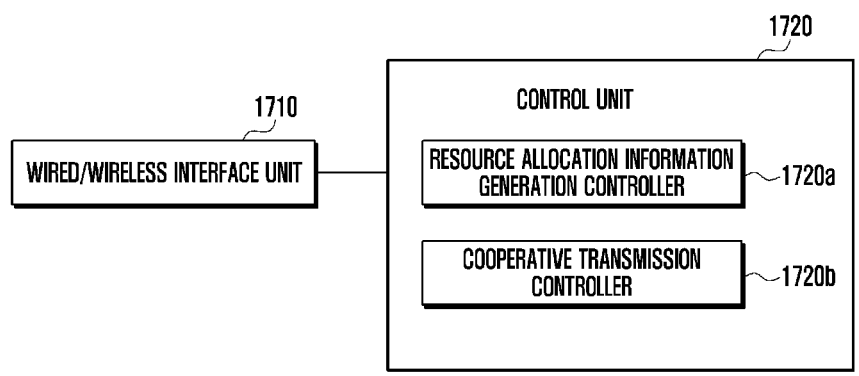
FIG. 17 is a block diagram illustrating a configuration of a slave BS according to another embodiment of the present disclosure.

FIG. 17 is a block diagram illustrating a configuration of a slave BS according to another embodiment of the present disclosure.

Referring to FIG. 17, the wired/wireless interface unit 1710 provides a wired and/or wireless interface for the slave BS to communicate with the MS or a higher layer network node through wired or wireless channel. In detail, the wireless interface is provided with a physical means for the slave BS to communicate control signal and data with the MS through radio communication, and the wired interface is provided with a wired communication means connected to a neighbor BS, a Mobility Management Entity (MME), and a Serving Gateway.

The control unit 1720 controls the resource allocation negotiation procedure with the master BS and service provision to the MS in cooperation with the master BS based on the negotiated resource allocation information. In order to accomplish this, the control unit 1720 includes a resource allocation information generation controller 1720*a* and a cooperative transmission controller 1720*b*.

If the resource allocation request message is received from the master BS, the resource allocation information generation controller 1720*a* determines whether to accept or reject the resource allocation request of the master BS. If it is determined to reject the request, the resource allocation information generation controller 1720*a* generates a resource allocation response message including the reject indication and controls the slave BS to send the resource allocation response message to the master BS. Otherwise, if it is determined to accept the resource allocation request from the master BS, the resource allocation information generation controller 1720*a* generates the resource allocation response message including the resource allocation information and data transmission scheme information and controls the slave BS to send the resource allocation response message to the master BS.

If a resource allocation confirmation message is received from the master BS, the resource allocation information generation controller 1720*a* determines whether to accept the resource allocation modification request included in the confirmation message. If it is determined to reject the resource allocation modification request of the master BS, the resource allocation information generation controller 1720*a* generates the decision-making message including the reject indication and controls the slave BS to send the master BS the decision-making message.

Finally, the slave BS transmits data to the MS in cooperation with the master BS and other slave BSs according to the final resource allocation information.

Figure 18:
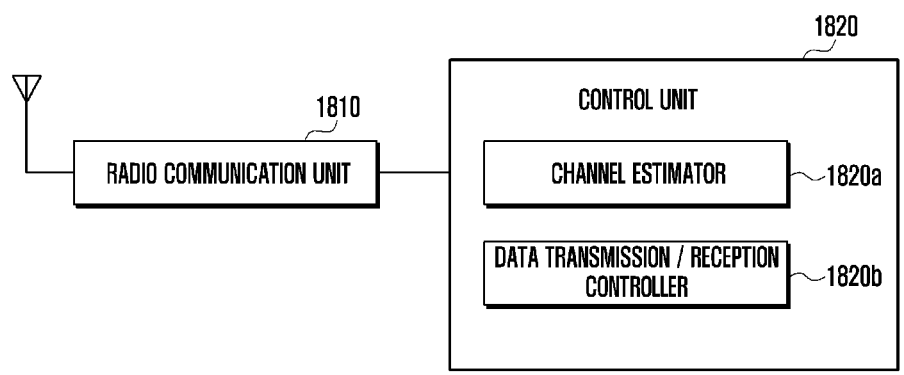
FIG. 18 is a block diagram illustrating a configuration of an MS according to an embodiment of the present disclosure.

FIG. 18 is a block diagram illustrating a configuration of an MS according to an embodiment of the present disclosure.

Referring to FIG. 18, the radio communication unit 1810 is responsible for radio communication function to transmit and receive data. The radio communication unit 180 may include a Radio Frequency (RF) transmitter for up-converting and amplifying the transmission signal and an RF receiver for low noise amplifying and down-converting the received signal. The radio communication unit 1810 is also capable of transferring the data received over the radio channel to the control unit 1820 and transmitting the data output by the control unit 1820 over the radio channel.

According to an embodiment of the present disclosure, the control unit 1820 measures the radio channel states to the master BS and at least one slave BSs forming a virtual cell and controls the MS to report the measurement result to the master BS and/or slave BSs. The control unit 1820 may also be capable of controlling the procedure of receiving the data transmitted by the master and slave BSs of the virtual cell and transmitting the data to the master and slave BSs based on the final resource allocation information. In order to accomplish this, the control unit 1820 includes a channel estimator 1820*a* and a data transmission/reception controller 1820*b*.

The channel estimator 1820*a* receives reference signals transmitted by BSs. The reference signals include a digital bit sequence for radio channel estimation. The channel estimator 1820*a* decodes the received reference signals to measure the quality of the signal propagated over a radio channel. The measured signal quality may be indicated by a Signal Strength, a SNR, or a SINR. The signal quality measured by the MS based on the RS is referred to as Channel Quality Information (CQI).

According to an embodiment of the present disclosure, the channel estimator 1820*a* may transmit the BS-specific CQI to the master BS (see FIG. 5*a*). Then, the master BS generates the resource allocation information based on the radio channel information between the MS and respective BSs.

According to an embodiment of the present disclosure, the master BS may transmit the BS-specific CQIs received from the MS to the slave BSs forming the virtual cell (see FIG. 8*a*). The channel estimator 1820*a* is also capable of transmitting the BS-specific CQIs to both the master and slave BSs (see FIG. 8*b*). This is because the detailed resource allocation information of the MS is generated by the slave BS, in the case of the embodiment of FIG. 6, and the slave BS has to check the radio channel information between the MS and the respective BSs.

The data transmission controller 1820*b* control the MS to receive and transmit data from and to the master and slave BSs forming the virtual cell based on the resource allocation information received from the master BS.

As described above, the resource allocation method and apparatus of the present disclosure is capable of allowing plural geographically-distributed base stations having independent decision-making right to negotiate resource allocation without any higher layer network node, thereby providing the mobile station with cooperative communication service efficiently.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a first base station for performing cooperative resource allocation with at least one second base station in a wireless communication system, the method comprising:
    transmitting a first reference signal generated based on a first digital bit sequence to a mobile station;
    receiving first channel quality information determined based on a signal to interference and noise ratio (SINR) of the first reference signal from the mobile station for a resource allocation;
    transmitting, to the second base station, a resource allocation request message, wherein the resource allocation request message includes information on a specific data to be transmitted to the mobile station when the second base station retains the specific data;
    receiving, from the second base station, a resource allocation response message including one of accept and reject indications to the resource allocation request message;
    transmitting a resource allocation information generated based on the first channel quality information to the mobile station; and
    transmitting a first packet, derived from data to be transmitted to the mobile station, to the mobile station in cooperation with the second base station based on the resource allocation information,
    wherein second channel quality information, determined based on a SINR of a second reference signal generated based on a second digital bit sequence and transmitted from the second base station to the mobile station, is transmitted from the mobile station to the second base station for the resource allocation,
    wherein the first digital bit sequence is specific to the first base station and the second digital bit sequence is specific to the second base station,
    wherein the first packet is transmitted from the first base station to the mobile station based on the first channel quality information,
    wherein a second packet, different from the first packet, derived from the data, is transmitted from the second base station to the mobile station based on the second channel quality information and the information on the specific data, and
    wherein the first packet and the second packet is combined into data by the mobile station.

2. The method of claim 1, wherein the transmitting of the resource allocation request message comprises requesting the second base station to allocate a specific radio resource.

3. The method of claim 1, further comprising:
    determining, after receiving a resource allocation response message, whether a change request for an allocated resource region exists in the resource allocation response message; and
    transmitting, when a change request exists, a resource allocation confirmation message including an indication on whether the change request is accepted by the second base station.

4. The method of claim 3,
    wherein the resource allocation request message comprises at least one of a number of resource blocks, a resource block index, a frame index, a subframe index, or data,
    wherein the resource allocation response message comprises at least one of a resource allocation request accept/reject indication, a number of resource blocks accepted, an accepted resource block index, an accepted frame, or an accepted subframe, and
    wherein the resource allocation confirmation message comprises at least one of a change request accept/reject indication, or a determined resource allocation information.

5. A method by a second base station for performing cooperative resource allocation with a first base station in a wireless communication system, the method comprising:
    transmitting a second reference signal generated based on a second digital bit sequence to a mobile station;
    receiving second channel quality information determined based on a signal to interference and noise ratio (SINR) of the second reference signal from the mobile station for a resource allocation;
    receiving, from the first base station, a resource allocation request message, wherein the resource allocation request message includes information on a specific data to be transmitted to the mobile station when the second base station retains the specific data;
    transmitting, to the first base station, a resource allocation response message including one of accept and reject indications to the resource allocation request message; and
    transmitting a second packet, derived from data to be transmitted to the mobile station, to the mobile station in cooperation with the first base station based on the information on the specific data and resource allocation information which is transmitted from the first base station to the mobile terminal, the resource allocation information being generated based on the second channel quality information,
    wherein first channel quality information, determined based on a SINR of a first reference signal generated based on a first digital bit sequence and transmitted from the first base station to the mobile station, is transmitted from the mobile station to the first base station for the resource allocation,
    wherein the first digital bit sequence is specific to the first base station and the second digital bit sequence is specific to the second base station,
    wherein the second packet is transmitted from the second base station to the mobile station based on the second channel quality information,
    wherein a first packet, different from the second packet, derived from the data, is transmitted from the first base station to the mobile station based on the first channel quality information, and
    wherein the first packet and the second packet is combined into data by the mobile station.

6. The method of claim 5, wherein the determining of whether to accept or reject the resource allocation request comprises a determination based on at least one of a resource headroom state, a conflict between resources reserved for other mobile stations and requested from the first base station, or a radio channel status.

7. The method of claim 5, wherein the transmitting of the resource allocation response message comprises:
    determining whether a conflict exists among resources requested for allocation from plural first base stations;
    arbitrating, when a conflict exists, to avoid overlap among resource allocation regions; and
    generating the resource allocation response message including arbitrated resource allocation information.

8. The method of claim 1, wherein the transmitting of resource allocation information comprises:

transmitting transmissive data information for initiating resource allocation negotiation to the second base station; and receiving a response message including resource allocation information for data transmission to the mobile station from the second base station.

9. The method of claim 8, further comprising:

transmitting, after receiving a response message, final resource allocation information generated based on the resource allocation information transmitted to the mobile station;

determining whether a conflict exists among resources requested by plural second base stations for allocation to the mobile station;

arbitrating, when a conflict exists, to avoid overlap among the allocated resource regions; and transmitting a confirmation message including a change request for the resource allocation information to the second base station.

10. The method of claim 9, further comprising:

receiving a decision-making message from the second base station in response to the confirmation message;

generating final resource allocation information based on acceptance or rejection to the change request included in the decision-making message; and transmitting the final resource allocation information to the mobile station.

11. The method of claim 8, wherein the resource allocation request message comprises at least one of a data size to be transmitted to the mobile station or a data transmission scheme, wherein the response message comprises at least one of a resource allocation request accept/reject indication, a resource block index, a frame index, a subframe index, or a data transmission scheme, wherein the confirmation message comprises at least one of an accept/reject indication to the response message, a changed resource block index, a changed frame index, or a changed subframe index, and wherein the decision-making message comprises an accept/reject indication to the confirmation message.

12. The method of claim 5, further comprising:

initiating resource allocation negotiation with the first base station upon receipt of transmissive data information transmitted by the first base station;

generating resource allocation information for data transmission to the mobile station;

transmitting a response message including the resource allocation information to the first base station; and transmitting data to the mobile station in cooperation with the first base station based on the resource allocation information.

13. The method of claim 12, wherein the transmissive data information is one of a resource allocation request message including information on data size and a data transmission scheme for resource allocation through the second base station and the data to be transmitted to the mobile station.

14. The method of claim 12, further comprising:

receiving a confirmation message including a change request for the resource allocation information from the first base station; and transmitting a decision-making message including an accept/reject indication to the change request to the first base station.

15. A first base station for performing cooperative resource allocation with at least one second base station in a wireless communication system, the first base station comprising:

a wired/wireless interface transceiver configured to perform wired/wireless communication with a mobile station and neighbor base stations; and at least one control processor configured to:

transmit a first reference signal generated based on a first digital bit sequence to a mobile station, receive first channel quality information determined based on a signal to interference and noise ratio (SINR) of the first reference signal from the mobile station for a resource allocation, transmit, to the second base station, a resource allocation request message, wherein the resource allocation request message includes information on a specific data to be transmitted to the mobile station when the second base station retains the specific data, receive, from the slave base station, a resource allocation response message including one of accept and reject indications to the resource allocation request message, transmit a resource allocation information generated based on the first channel quality information to the mobile station, and transmit a first packet, derived from data to be transmitted to the mobile station, to the mobile station in cooperation with the second base station based on the resource allocation information, wherein second channel quality information, determined based on a SINR of a second reference signal generated based on a second digital bit sequence and transmitted from the second base station to the mobile station, is transmitted from the mobile station to the second base station for the resource allocation, wherein the first digital bit sequence is specific to the first base station and the second digital bit sequence is specific to the second base station, wherein the first packet is transmitted from the first base station to the mobile station based on the first channel quality information, wherein a second packet, different from the first packet, derived from data, is transmitted from the second base station to the mobile station based on the second channel quality information and the information on the specific data, and wherein the first packet and the second packet is combined into data by the mobile station.

16. The first base station of claim 15, wherein the at least one control processor is further configured to control requests of the second base station to allocate a specific radio resource.

17. The first base station of claim 15, wherein the at least one control processor is further configured to:

determine, after receiving a resource allocation response message, whether a change request for an allocated resource region exists in the resource allocation response message, and perform transmitting, when a change request exists, a resource allocation confirmation message including an indication on whether the change request is accepted to the second base station.

18. A second base station for performing cooperative resource allocation with a first base station in a wireless communication system, the second base station comprising:

a wired/wireless interface transceiver configured to perform wired/wireless communication with the mobile station and neighbor base stations; and at least one control processor configured to:
transmit a second reference signal generated based on a second digital bit sequence to a mobile station,
receive second channel quality information determined based on a signal to interference and noise ratio (SINR) of the second reference signal from the mobile station for a resource,
receive, from the first base station, a resource allocation request message, wherein the resource allocation request message includes information on a specific data to be transmitted to the mobile station when the second base station retains the specific data,
transmit, to the first base station, a resource allocation response message including one of accept and reject indications to the resource allocation request message, and
transmit a second packet, derived from data to be transmitted to the mobile station, to the mobile station in cooperation with the first base station based on the information on the specific data and resource allocation information which is transmitted from the first base station to the mobile terminal, the resource allocation information being generated based on the second channel quality information,
wherein first channel quality information, determined based on a SINR of a first reference signal generated based on a first digital bit sequence and transmitted from the first base station to the mobile station, is transmitted from the mobile station to the first base station for the resource allocation,
wherein the first digital bit sequence is specific to the first base station and the second digital bit sequence is specific to the second base station,
wherein the second packet is transmitted from the second base station to the mobile station based on the second channel quality information,
wherein a first packet, different from the second packet, derived from the data, is transmitted from the first base station to the mobile station based on the first channel quality information, and
wherein the first packet and the second packet is combined into data by the mobile station.

19. The second base station of claim 18, wherein the at least one control processor is further configured to determine whether to accept or reject the resource allocation request based on at least one of a resource headroom state, a conflict between resources reserved for other mobile stations and requested from the first base station, or a radio channel status.

20. The second base station of claim 18, wherein the at least one control processor is further configured to:
determine whether a conflict exists among resources requested for allocation from plural first base stations,
arbitrate, when a conflict exists, to avoid overlap among resource allocation regions, and
generate the resource allocation response message including arbitrated resource allocation information.

21. The first base station of claim 15, wherein the at least one control processor is further configured to:
transmit transmissive data information for initiating resource allocation negotiation to the second base station,
receive a response message including a resource allocation information for data transmission to the mobile station from the second base station, and
transmit data to the mobile station in cooperation with the second base station based on the resource allocation information.

22. The first base station of claim 21, wherein the transmissive data information is one of a resource allocation request message including information on data size and a data transmission scheme for resource allocation through the second base station and the data to be transmitted to the mobile station.

23. The first base station of claim 21, wherein the at least one control processor is further configured to:
transmit final resource allocation information generated based on the resource allocation information to the mobile station,
determine whether a conflict exists among resources requested by plural second base stations for allocation to the mobile station,
arbitrate, when a conflict exists, to avoid overlap among the allocated resource regions,
transmit a confirmation message including a change request for the resource allocation information to the second base station,
receive a decision-making message from the second base station in response to the confirmation message,
generate a final resource allocation information based on acceptance or rejection to the change request included in the decision-making message, and
transmit the final resource allocation information to the mobile station.

24. The second base station of claim 18, wherein the at least one control processor is further configured to:
initiate resource allocation negotiation with the first base station upon receipt of transmissive data information transmitted by the first base station,
generate resource allocation information for data transmission to the mobile station,
transmit a response message including the resource allocation information to the first base station, and
transmit data to the mobile station in cooperation with the first base station based on the resource allocation information.

25. The second base station of claim 24,
wherein the transmissive data information is one of a resource allocation request message including information on data size and a data transmission scheme for resource allocation through the second base station and the data to be transmitted to the mobile station, and
wherein the at least one control processor is further configured to:
receive a confirmation message including a change request for the resource allocation information from the first base station, and
transmit a decision-making message including an accept/reject indication to the change request to the first base station.

26. The method of claim 1, wherein the transmitting resource allocation information comprises:
transmitting, to the second base station, a resource allocation request message including information on a resource to be allocated to the mobile station;
receiving a resource allocation response message including one of accept and reject indications to the resource allocation request from the second base station; and transmitting, to the mobile station, a resource allocation information including a result of resource allocation negotiation with the second base station.

27. The method of claim 5, further comprising:
receiving a resource allocation request message including information on a resource to be allocated to the mobile station from the first base station;
determining whether to accept or reject the resource allocation request of the first base station; and
transmitting a resource allocation response message including a determination result to the first base station.

28. The first base station of claim 15, wherein the at least one control processor is further configured to:
transmit, to the second base station, a resource allocation request message including information on a resource to be allocated to the mobile station,
receive a resource allocation response message including one of accept and reject indications to the resource allocation request from the second base station,
transmit, to the mobile station, a resource allocation information including a result of resource allocation negotiation with the second base station, and
transmit data to the mobile station in cooperation with the second base station based on the resource allocation information.

29. The second base station of claim 18, wherein the at least one control processor is further configured to:
receive a resource allocation request message including information on a resource to be allocated to the mobile station from the first base station,
determine whether to accept or reject the resource allocation request of the first base station,
transmit a resource allocation response message including a determination result to the first base station, and
transmit data to the mobile station in cooperation with the first base station using the resource determined through resource allocation negotiation with the first base station.

* * * * *